United States Patent [19]

Kiem et al.

[11] Patent Number: 5,815,820
[45] Date of Patent: Sep. 29, 1998

[54] TRANSMITTER HAVING ADJUSTABLE POWER LEVELS RESPONSIVE TO THE POSITION OF A MOVABLE ANTENNA

[75] Inventors: Joshua P. Kiem, Park Ridge; Michael P. Metroka, Algonquin; Kevin D. Kaschke, Hoffman Estates; Raymond A. Jenski, Palatine, all of Ill.

[73] Assignee: Motorola, Inc., Schaumburg, Ill.

[21] Appl. No.: 880,918

[22] Filed: May 11, 1992

Related U.S. Application Data

[63] Continuation-in-part of Ser. No. 729,502, Jul. 12, 1991.

[51] Int. Cl.[6] ....................................................... H04B 1/38
[52] U.S. Cl. ........................... 455/575; 455/90; 343/702
[58] Field of Search ................................. 455/89, 90, 82, 455/83, 126, 128, 129, 127; 343/702, 901

[56] References Cited

U.S. PATENT DOCUMENTS

| | | | |
|---|---|---|---|
| 4,121,218 | 10/1978 | Irwin et al. ................................. | 343/702 |
| 4,862,182 | 8/1989 | Egashira ...................................... | 343/702 |
| 4,914,714 | 4/1990 | Tamura ..................................... | 455/89 X |
| 4,958,782 | 9/1990 | Imanishi ..................................... | 455/73 |
| 5,048,117 | 9/1991 | Aisaka et al. ............................... | 455/89 |
| 5,109,538 | 4/1992 | Ikonen et al. .............................. | 455/126 |
| 5,109,539 | 4/1992 | Inubushi et al. ........................... | 455/89 |
| 5,138,329 | 8/1992 | Saarnimo et al. ......................... | 343/702 |
| 5,144,324 | 9/1992 | Chin et al. ............................. | 455/127 X |
| 5,179,353 | 1/1993 | Miyake ..................................... | 455/126 |
| 5,541,609 | 7/1996 | Stutzman et al. ......................... | 455/575 |

OTHER PUBLICATIONS

Motorola, Inc., User Manual (©1991) 68P09357A20–0, for a cellular mobile telephone.
An FCC application (dated Feb. 19, 1992) and grant (dated Mar. 18, 1992) for equipment authorization (FCC ID: AXATR–208–AZ).
EIA Standard, Cellular System Mobile Station—Land STation Comaptibility Specification, IS–3–D, Mar. 1989.

*Primary Examiner*—Edward F. Urban
*Attorney, Agent, or Firm*—Kevin D. Kaschke

[57] ABSTRACT

A portable radiotelephone (200) adjusts its transmit power responsive to the position of a movable antenna (213). The antenna (213) is movable between a retracted (313) and an extended position (314). The portable radiotelephone (200) transmits at low power when the antenna (213) is retracted and at high power when the antenna (213) is extended. Additionally, the portable radiotelephone (200) can notify a remote base station of the change in transmit power at any time during transmission.

22 Claims, 13 Drawing Sheets

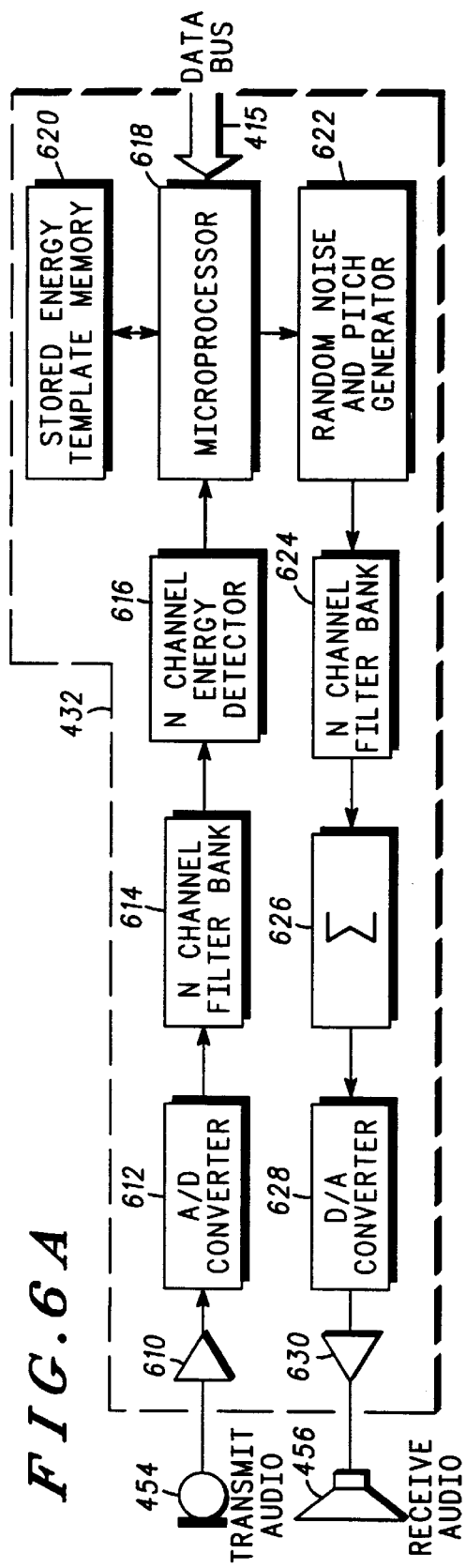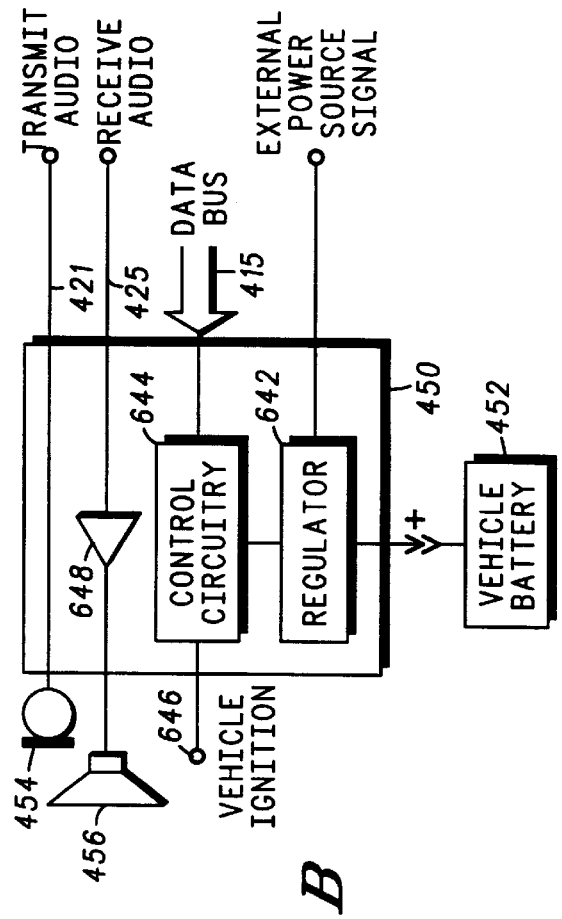
FIG.6A
FIG.6B

TRANSMITTER HAVING ADJUSTABLE POWER LEVELS RESPONSIVE TO THE POSITION OF A MOVABLE ANTENNA

RELATED APPLICATIONS

The present application is a Continuation in Part of patent application Ser. No. 07/729,502, entitled "Apparatus and Method for Generating a Control Signal Responsive to a Movable Antenna", filed on Jul. 12, 1991 by Kevin D. Kaschke and assigned to the assignee of the present invention.

FIELD OF THE INVENTION

The present invention relates generally to portable communication devices, and more particularly to a portable transmitting device having adjustable transmit power levels responsive to the position of a movable antenna.

BACKGROUND OF THE INVENTION

A portable communication device, of which a portable cellular radiotelephone subscriber unit is a convenient example, provides an appropriate setting for describing the need for the present invention. The small size of portable radiotelephones enables the user to carry and store the unit virtually anywhere.

Such portability is afforded by the use of a foldable housing and a movable antenna. FIG. 1 shows a foldable portable radiotelephone 100 having a housing portion 101 hinged to a body portion 103 and an antenna 109 extendably retractable along its longitudinal axis. For increased portability when the portable radiotelephone 100 is not in use, the hinged housing portion 101 is rotated to cover the keypad 105 and the antenna is retracted substantially inside to the body of the portable radiotelephone. A retracted antenna can transmit and/or receive radio frequency (RF) signals but the antenna's performance is less than an extended antenna because of its shortened electrical length and interference from the close proximity of the user's body. To use the portable radiotelephone, the hinged housing portion 101 is rotated to expose the keypad 105 and the antenna is extended to project away from the body of the portable radiotelephone for better performance.

This portability, however, allows the portable radiotelephone to be placed in locations where foreign objects may come in contact with a user interface mechanism (i.e. a keypad) and inadvertently enable or disable control functions of the radiotelephone. Such undesirable actuation of the control functions is likely to engage related functions which reduce the operating life of a storage battery which powers the portable radiotelephone and may inhibit normal operation.

U.S. Pat. No. 4,845,772 and U.S. patent applications Ser. Nos. 07/439,993 and 07/439,983 describe portable radiotelephones that enable or disable control functions of the radiotelephone responsive to the position of the hinged housing portion. Steps have been taken, however, to reduce the cost, weight and thickness of the portable radiotelephone by eliminating the hinged housing portion. In doing so, the advantages of controlling functions of the portable radiotelephone responsive to the hinged housing portion are lost.

Accordingly, there is a need for a portable communication device, of which a cellular portable radiotelephone is merely an example, having functions that can be controlled without the use of a hinged housing portion.

Portable radiotelephone antennas radiate RF electromagnetic energy while transmitting an RF signal. The human body, and more particularly, the human head is biologically sensitive to excessive levels of radiated energy. The level of exposure of the human body to the radiated energy is related at least in part to the power level of the transmitted signal and the distance between the antenna and the human body. Exposure increases with increasing power level or decreasing distance.

Portable radiotelephones, by design, are held against the user's head so that the user may conveniently listen via an earpiece speaker and talk via a microphone. Such a design results in the antenna being located near the user's head, thus unavoidably exposing the user's head to the radiated energy. Safety standards have been established by the U.S. government to safely limit the exposure of humans to the radiated energy. The safety standards have been more than met by limiting the power level of the transmitted signal.

However, a consequence of limiting the portable radiotelephone's transmit power is that the physical distance from which the portable radiotelephone may transmit a signal to a remote base station is limited. Thus, limiting the portable radiotelephone's transmitter power to meet the safety standards also limits the useful transmit range of the portable radiotelephone.

Accordingly, there is also a need for a transmitting device, of which a cellular portable radiotelephone is merely an example, that can transmit RF signals at a higher power level while limiting the exposure of humans to energy radiated by the transmitter's antenna.

A portable radiotelephone comprises antenna means including an antenna element, and a transmitter. The antenna element is moveable between a stowed position and an unstowed position. The transmitter transmits a signal from the antenna means at a first power level when the antenna element is moved to the stowed position and at a second power level, greater than the first power level, when the antenna element is moved to the unstowed position.

BRIEF DESCRIPTION OF THE DRAWINGS

FIGS. 6A and 6B are block diagrams of voice recognition circuitry and vehicular adaptor (hands-free) circuitry, respectively, employed in FIG. 4.

DETAILED DESCRIPTION OF A PREFERRED EMBODIMENT

Figures 1, 2:
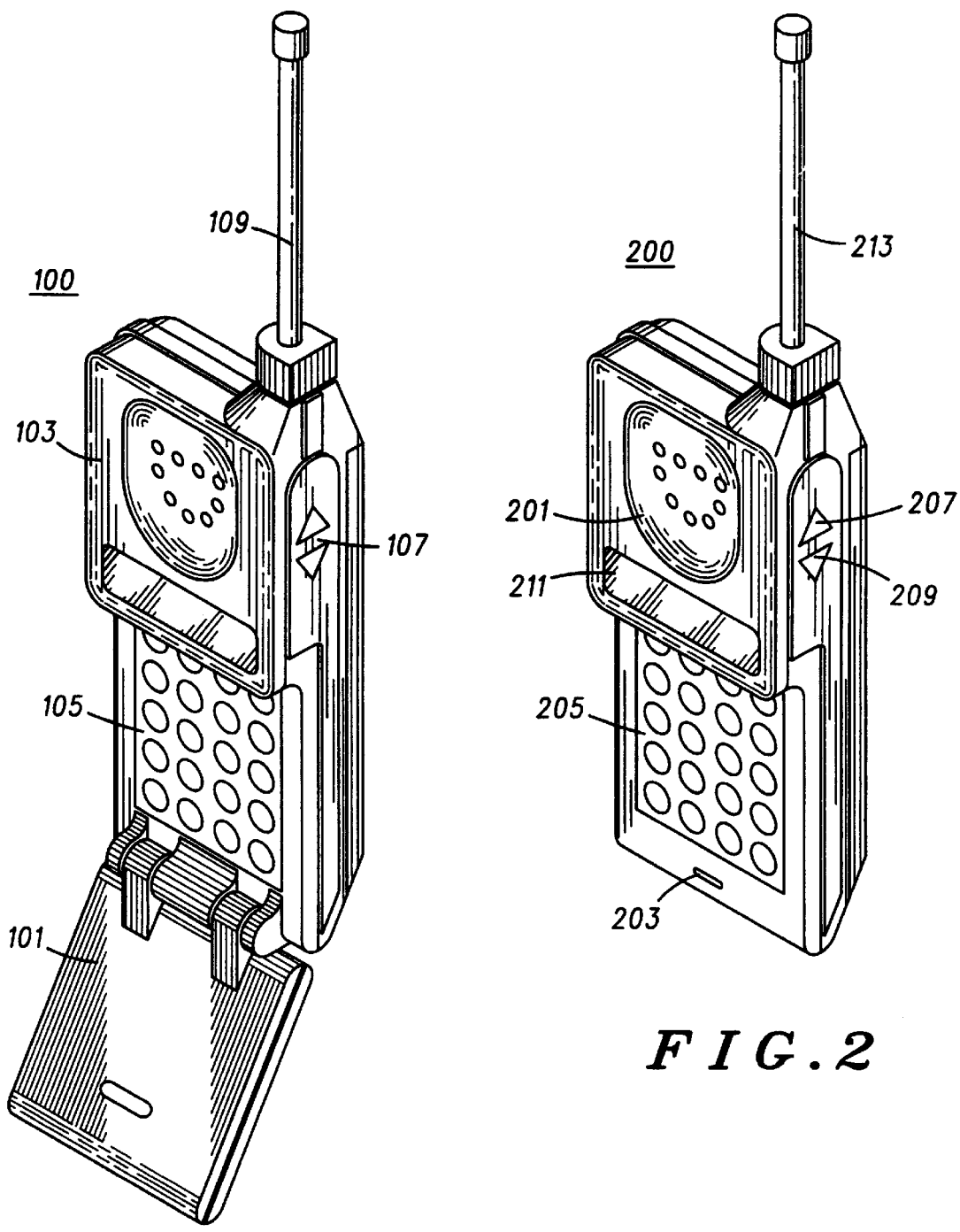
FIG. 1 is an isometric drawing of a portable radiotelephone having a hinged housing portion which may employ the present invention.
FIG. 2 is an isometric drawing of a portable radiotelephone without a hinged housing portion which may employ the present invention.

A portable radiotelephone 200 adapted for use in a cellular radiotelephone system is shown in FIG. 2. The user may listen via the earpiece 201 and may speak into the microphone 203. The keypad 205 consists of a plurality of buttons numbered one through zero, # and * in a familiar telephone arrangement as well as additional function buttons such as "send", "end", "clear", "function", "on/off" and other buttons associated with memory recall. Disposed on a side of the portable radiotelephone are two volume control buttons: volume increase 207 and volume decrease 209, which may adjust the volume of the earpiece and/or the ringer. A display 211, disposed above the keypad 205, provides visual feedback for the buttons depressed and other operational features. A wireless communication element, for example antenna 213, provides wireless transceiving communications between the the portable radiotelephone 200 and the cellular radiotelephone system. To reduce the cost, weight and thickness of the portable radiotelephone 200, the hinged housing portion 101 used by the portable radiotelephone 100 of FIG. 1 is not attached to the radiotelephone 200 of FIG. 2.

As in typical wireless communication devices, the antenna 213 is extended when the portable radiotelephone 200 is in use and retracted when the portable radiotelephone 200 is not in use. However, in addition to positioning the radiotelephone's antenna 213 for transceiving communication signals, a novel feature of the radiotelephone 200 comprises controlling a predetermined operating mode of the radiotelephone 200 responsive to the antenna's position while providing for the advantage of reduced cost, weight and thickness. The predetermined operating mode is a particular functioning arrangement or condition of the radiotelephone including but not limited to the radiotelephone's 200 power on or off state, voice recognition's on or off state, functions implemented responsive to a key depression, or transmit power.

Figure 3A:
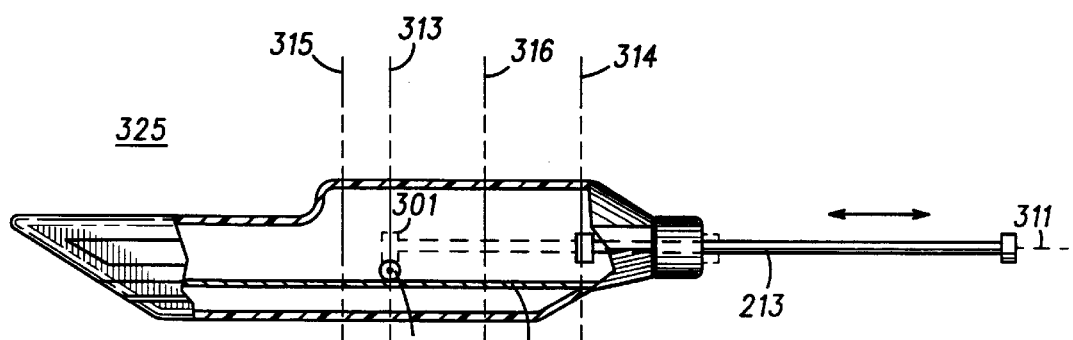
FIGS. 3A–3C are side views of the portable radiotelephone of FIG. 2 having a cut-away view showing a first, second, and third embodiment, respectively, of the the radiotelephone of FIG. 2.
Figure 3B:
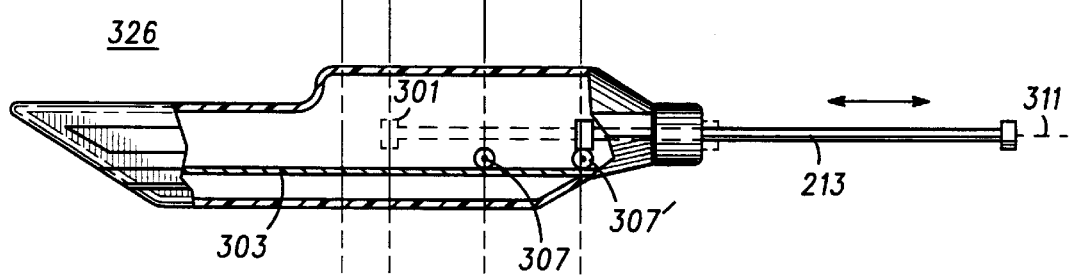
Figure 3C:
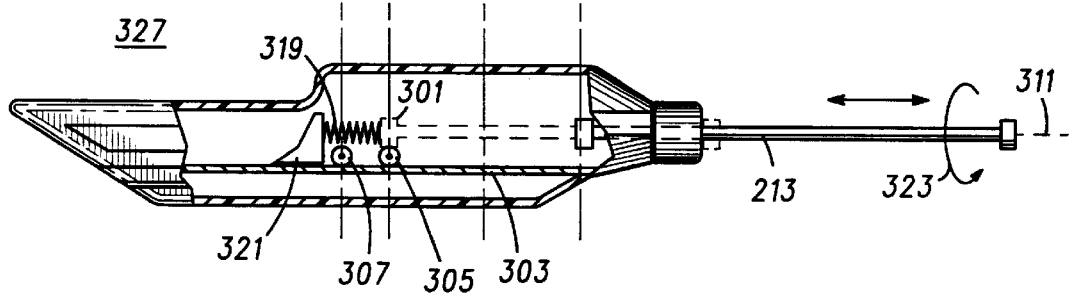

FIGS. 3A–3C illustrate a side view of a first 325, second 326 and third 327 embodiment, respectively, of the portable radiotelephone 200 of FIG. 2. A cut-away portion exposing a cross sectional view in FIGS. 3A–3C illustrate unique switching mechanisms for implementing alternatives of the present invention. In the preferred embodiments 325–327 the antenna 213 may be perceived to extend (solid line) substantially outside the radiotelephone 200 or retract (dotted line) substantially inside the radiotelephone 200 along a center axis 311 of the antenna 213. A first, second, third and fourth position of the antenna 213 inside the radiotelephone 200 are referenced to datum lines at 313–316, respectively. The first position at 313 represents the position of a retracted antenna. The second position at 314 represents the position of an extended antenna. The third position at 315 represents the position of a retracted antenna further retracted into the radiotelephone 200 than the first position at 313. The fourth position at 316 represents the position of the antenna between the first and the second position, for example, approximately half way between the retracted position at 313 and the extended position at 314 of the antenna 213.

An example of a movable antenna that may be used in accordance with the present invention is described in U.S. Pat. No. 4,121,218. The movable antenna comprises a stationary helical coil capacitively coupled to an extendable half-wavelength radiator. The radio transmits primarily from the stationary helical coil when the half-wavelength radiator is retracted and primarily from the half-wavelength radiator when the half-wavelength radiator is extended.

The preferred embodiments 325–327 utilize conventional reed switches 305 and 307 electrically coupled to a printed circuit board 303 and a magnet 301 affixed to an end portion of the antenna 213 inside the radiotelephone 200. A magnetic field given off by the magnet 301 causes the reed switches 305 or 307 to close, i.e., short circuit, when placed in close proximity to one of the reed switches and to open circuit when displaced from one of the reed switches. The reed switches 305 and 307 are coupled to the radiotelephone circuitry which takes appropriate action responsive to the open or closed state of the reed switches 305 or 307.

Referring now to FIG. 3A one may appreciate the advantages of the first preferred embodiment of the present invention wherein a hookswitch control signal (at line 511 in FIG. 5) is generated responsive to the antenna's position. Once a typical portable radiotelephone is turned "on" by conventionally depressing the "on/off" key on the keypad 205, answering, terminating or readying a telephone call requires a key depression or rotating the aforementioned hinged housing portion to generate the hookswitch control signal. Additionally, the antenna is typically extended during use for optimal wireless communication performance and retracted when not in use.

Figure 5:
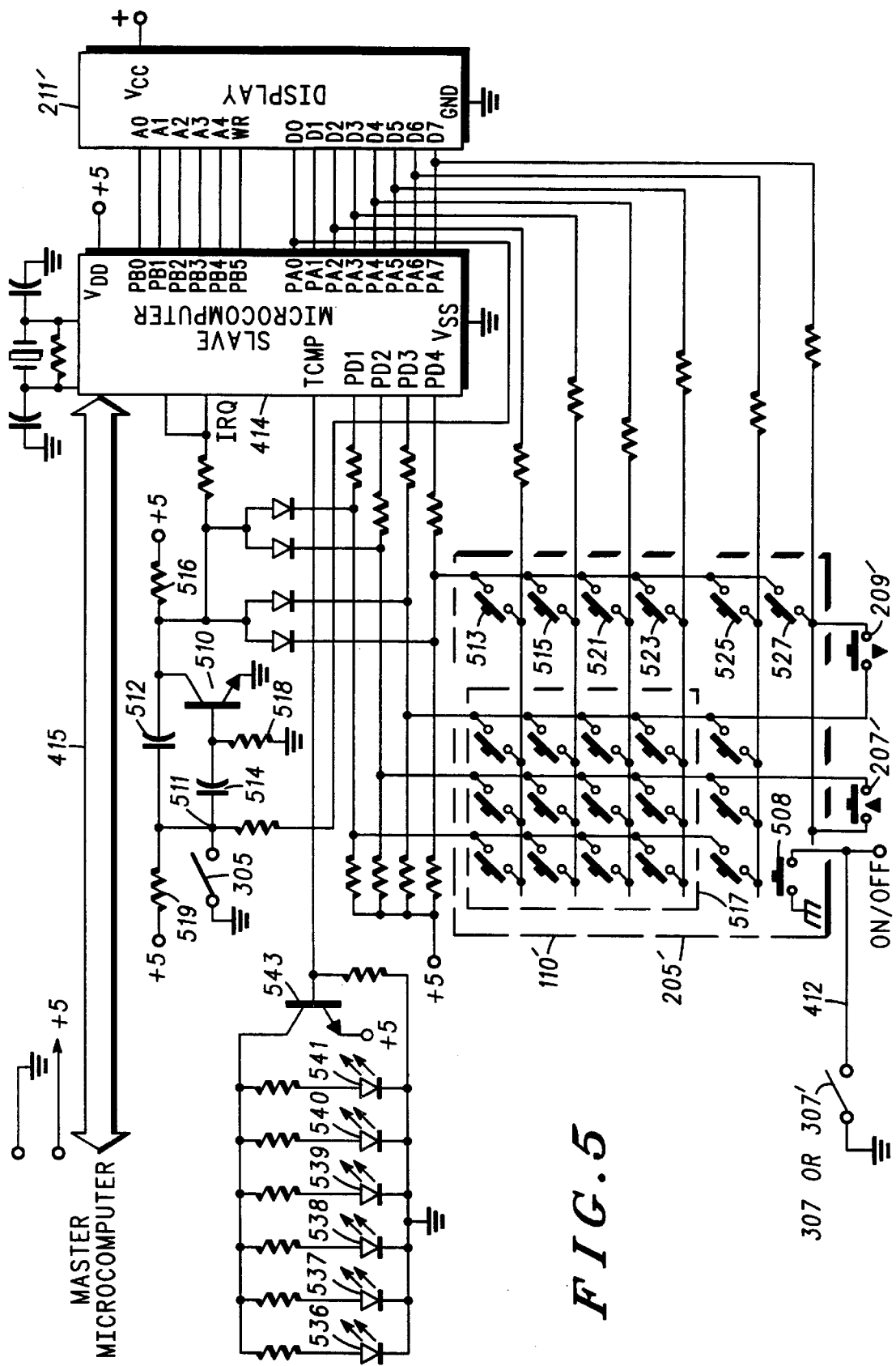
FIG. 5 is a schematic diagram of a slave microcomputer and associated circuitry employed in the portable radiotelephone of FIG. 4.

In the first preferred embodiment, however, the hookswitch control signal at line 511 of FIG. 5 is generated responsive to the position of the antenna 213 relative to the portable radiotelephone 325. Thus the key depression or rotation of the hinged housing portion to generate the hookswitch control signal at line 511 of FIG. 5 is eliminated. This feature of the radiotelephone 325 provides the user greater convenience in operating the radiotelephone. The user may answer a telephone call by simply extending the antenna 213.

Extending the antenna 213 may also ready the portable radiotelephone to make a call. Such a state of answering or readiness to make a call is commonly know as "off-hook". To make a call, the user enters the appropriate phone number through the keypad and depresses the "send" button to activate the portable radiotelephone's transmitter thereby initiating communication with the cellular radiotelephone system. In the first preferred embodiment, the "send" key 513 (FIG. 5) may also be used to answer a telephone call if the antenna is already extended. The user may terminate the telephone call by retracting the antenna 213. Such a retracted state of the antenna is commonly known as "on-hook". In the first preferred embodiment, the "end" key 515 (FIG. 5) may also be used to terminate a telephone call if the antenna is already extended.

In FIG. 3A, one may perceive the generation of the hookswitch control signal at line 511 of FIG. 5 responsive the antenna 213 being moved between the retracted position at 313 and the extended position at 314. An "on-hook" control signal is generated when the antenna 213 is retracted substantially inside the portable radiotelephone 325 to the first position at 313 such that the magnet 301 on the end portion of the antenna 213 is in close proximity with the reed switch 305. The magnetic field given off by the magnet 301 causes the reed switch 305 to short circuit thereby placing the radiotelephone 325 in the "on-hook" state. Extending the antenna 213 substantially outside the portable radiotelephone 325 to the second position at 314 displaces the magnetic field given off by the magnet 301 from the reed switch 305 causing the reed switch 305 to open circuit placing thereby placing radiotelephone 325 in the "off-hook" state. In the first preferred embodiment, the combination of the magnet 301 and the reed switch 305 coupled to the printed circuit board 303 may be known as the hookswitch. In the first preferred embodiment, the antenna 213 has at least two positions relative to the radiotelephone 325 in order to generate both the "on-hook" and "off-hook" operating modes.

To generate the "on-hook" and "off-hook" operating modes without positioning the antenna 213, the user may also conventionally depress the "end" 515 and "send" 513 keys, respectively, on the keypad 205. Similar radiotelephone devices, such as conventional cordless radiotelephones, have a dedicated switch to produce the "on-hook" and "off-hook" operating modes. In the first preferred embodiment, the "on-hook" and "off-hook" operating modes are produced by actuating the "send" 513 or "end" 515 keys on the keypad 205 or by moving the antenna 213 to provide optimum user convenience and functionality for the radiotelephone if the antenna should become inoperable.

Table 1 describes the "on-hook" and "off-hook" operating modes produced by actuating the "send" 513 or "end" 515 keys or by moving the antenna 213 after the radiotelephone 325 is already turned "on". The "end" and "send" key depression may place the radiotelephone in an "on-hook" or "off-hook" state, respectively. The antenna position may be extended (out) outside the radiotelephone, or retracted (in) within the radiotelephone. Extending the antenna 213 places the radiotelephone 325 "off-hook" regardless of whether the radiotelephone 325 was placed in the "on-hook" or "off-hook" by a key depression. Similarly, retracting the antenna 213 places the radiotelephone 325 in the "on-hook" state regardless of whether the radiotelephone 325 was placed in the "on-hook" state or in the "off-hook" state by a key depression.

TABLE 1

| Hookswitch state after the key depression. | Antenna movement. | Hookswitch state after the antenna movement. |
| --- | --- | --- |
| on-hook | in to out | off-hook |
| off-hook | in to out | off-hook |
| on-hook | out to in | on-hook |
| off-hook | out to in | on-hook |

Determining the hookswitch state responsive to the position of the antenna not only simplifies operation of the portable radiotelephone for the user but also allows certain control functions to be advantageously enabled or disabled at the appropriate time. Control functions related to the mode of operation of the portable radiotelephone 325 may be disabled to prevent accidental operation when the antenna 213 is in its retracted position at 313, i.e., when the portable radiotelephone 325 is not in use, and may be enabled when the antenna 213 is in its extended position at 314, i.e., when the portable radiotelephone 325 is in use.

For example, when the portable radiotelephone 325 is in its standby condition, i.e., turned "on" but in a low power mode to conserve battery power while awaiting a telephone call, it would be undesirable to have the previously described foreign object inadvertently turn the radiotelephone 325 off or initiate a battery power draining function such as a key depression. Therefore, retracting the antenna 213 on the portable radiotelephone 200 may disable user interface controls, either on the keypad 205 or on other peripheral surfaces of the radiotelephone 325, such as the "on/off" 508, number dialling 517, volume controls 207' and 209', "send" 513, "end" 515, "clear" 521, "function" 523 and memory store 525 and recall 527 controls. Additionally, a retracted antenna at 313 may disable circuitry such as voice recognition circuitry as shown in FIG. 6A and hands-free circuitry as shown in FIG. 6B. Extending the antenna 213 enables the aforementioned disabled control functions and circuitry as well as keypad illumination 536–541 and display circuitry 211' per FIG. 5.

Referring now to FIG. 3B, an illustration of the second preferred embodiment, one may perceive the generation of the on/off power control signal responsive to the antenna position. In the second preferred embodiment, the user need only extend the antenna 213 and the portable radiotelephone 326 automatically turns "on" thus eliminating both of the previously described typical steps of opening the hinged housing portion and depressing the "on/off" key 508 (FIG. 5). Likewise, to turn "off" the portable radiotelephone 326, the user need only retract the antenna 213 again eliminating both of the previously described typical steps of depressing the "on/off" key 508 and closing the hinged housing portion. In the second preferred embodiment, the "on-hook" and "off-hook" operating modes are generated using a conventional key depression. A further advantage of the second preferred embodiment allows the designer of the portable radiotelephone to eliminate the "on/off" key on the keypad 205 completely thus reducing the cost and surface area of the keypad.

Generating the on/off power control signal responsive to the antenna position may be conveniently used with a second-generation cordless telephone service called CT-2. One feature of the CT-2 cordless telephone is that it will only allow outgoing calls. Therefore, the user should not have a need to extend the antenna without the intention of making a telephone call, i.e., the cordless telephone must be powered "on".

An on/off power control signal 412 (FIG. 4 and 5) is generated when the antenna 213 is moved from its retracted position at 313, past the half way position at 316 to its extended position at 314. Generation of the on/off power control signal 412 in the second preferred embodiment occurs when magnet 301 momentarily short circuits the reed switch 307 at the half way position at 316. As the antenna 213 passes the half way position at 316, the magnetic field given off by the magnet 301 comes in close proximity with the reed switch 307 causing the reed switch 307 to momentarily short circuit thereby generating the on/off power control signal 412.

The movement of the antenna from the retracted position at 313 through the half way position at 316 to the extended position at 314 causes the reed switch 307 to be momentarily actuated producing the on/off power control signal 412 to turn the radiotelephone "on". The movement of the antenna from the extended position at 314 past the half way position at 316 to the retracted position at 313 causes the reed switch 307 to be momentarily short circuited producing the on/off power control signal 412 to turn the radiotelephone "off".

A logic interface circuit in a power controller 410 (FIG. 4) detects the momentary reed switch closure and initiates the steps to turn the portable radiotelephone 326 "on" if previously "off" or "off" if previously "on". Details describing the logic interface circuit may be referenced in U.S. Pat. No. 4,798,975 entitled "High Noise Immunity Input Level Detector With Hysteresis", filed in behalf of Walczak et. al. and assigned to the assignee of the present invention. Other logic interface circuits may also be used to detect the momentary reed switch closure.

To conventionally turn "on" or "off" the portable radiotelephone 326 without positioning the antenna 213, the user may also depress the "on/off" key 508 on the keypad 205. In a first alternative to the second preferred embodiment of the present invention, the depression of the "on/off" key 508 or moving the antenna 213 may generate the on/off control signal 412 to provide optimum user convenience and functionality for the radiotelephone if the antenna should become inoperable.

In a second alternative of the second preferred embodiment the radiotelephone 326 utilizes a continuously open or closed switch to determine the on/off power operating mode. For example, cordless radiotelephones do not use a momentary on/off power switch. Conventional cordless radiotelephones have a slide switch which places the radiotelephone in the "on" mode when short circuited and places the radiotelephone in the "off" mode when open circuited. The "on" or "off" mode of a cordless radiotelephone may utilize the present invention by positioning the reed switch 307 at one extreme of the antenna movement. In FIG. 3B the alternative position for the reed switch 307' is shown at position 314. Thus, when the antenna 213 is retracted to 313, the reed switch 307' is open and the radiotelephone 326 is in the "off" operating mode. Likewise, when the antenna is extended to 314, the reed switch 307' is closed and the radiotelephone 326 is in the "on" operating mode.

Referring now to FIG. 3C, an illustration of the third preferred embodiment, one may perceive the generation of both the hookswitch 511 and the on/off power control 412 signals responsive to the antenna position. Depressing the "on/off" key 508 on the keypad 205 to generate a power control signal 412 and the "send" 513 or "end" 515 key on the keypad 205' to produce the hookswitch operating mode are combined with the antenna movement to provide optimum user convenience and radiotelephone functionality should the antenna become inoperable. In the third preferred embodiment, the antenna 213 has at least three positions. The hookswitch control signal 511 is generated responsive to positioning the antenna between the first retracted position at 313 and the second extended position at 314 as previously described in the first preferred embodiment. The on/off power control signal 412 is generated responsive to momentarily positioning the antenna 213 in the third position at 315 also on the axis of the antenna 311.

To power "on" the portable radiotelephone using the antenna 213, the user would momentarily position the antenna in the third position 315 by depressing the exposed portion of the retracted antenna 213 into the radiotelephone. Upon depressing the antenna 213, the end portion of the antenna inside the radiotelephone presses against a spring 319 of nonmagnetic material generating a spring force against the end of the antenna 213 along the antenna axis 311. One end of the spring 319 is attached to a support 321 to fixture the spring 319. The other end of the spring 319, opposite the support 321, extends into free space and may be forced upon by the antenna 213.

The force applied by the user overcomes the opposite force returned by the spring 319 so that the magnet 301 moves from its position at 313 in proximity to the reed switch 305 to the position at 315 in proximity to the reed switch 307. The spring 319 completely collapses when the magnet 301 is closest to the reed switch 307 so that the magnet does not move past the reed switch 307. Consequently, the reed switch 305 becomes an open circuit and the reed switch 307 becomes a closed circuit.

When the user releases the applied force on the exposed end portion of the antenna, the spring 319 forces the antenna 213 to its normally retracted position at 313 which causes reed switch 307 to become an open circuit and the reed switch 305 to become a short circuit. The antenna may then be positioned to the extended position at 314 or the retracted position at 313 to generate the "off-hook" or "on-hook" states, respectively. The force required by the user to position the antenna in the third position at 315 by compressing the spring 319 is substantially greater than the force required to move the antenna between the retracted 313 and extended 314 positions. Thus, the radiotelephone may not be unintentionally turned "on" or "off" when positioning the antenna to generate the hookswitch signal 511 and may be inhibited from accidental actuation of the on/off control signal 412 produced by positioning the antenna at position 315.

The third preferred embodiment includes the advantages of both the aforementioned first and the second preferred embodiments. The on/off and hookswitch control signals generated by the antenna may also be generated by a key depression giving the user optimal convenience and radiotelephone functionality if the antenna 213 should become inoperable.

An alternative to generating the on/off control signal described in the third preferred embodiment comprises spinning the antenna 213 about the axis 311 of the antenna 213 as shown at 323 instead of depressing the antenna to the third position at 315. Conventional switching mechanisms responsive to a spinning motion about an axis are well know to those skilled in the art and may be employed in this alternative. Axial displacement of the antenna between the retracted and extended positions at 313 and 314 respectively, would continue to generate the hookswitch control signal at 511. The advantage of the spinning movement of the antenna 213 is that, in some user applications, spinning the antenna 213 about its axis 311 would make the antenna 213 substantially more immune to accidental power actuation than depressing the antenna into the radiotelephone 326 along its axis 311 to position 315.

A variety of antenna structures are well known in the art and may be used to implement the present invention so long as the antenna 213 is movable. Although the preferred embodiment describes an antenna 213 which extends and retracts axially with respect to the portable radiotelephone 200 this should not be a limitation of the present invention for other antenna movements may be used to generate the control signal if so desired. For example, one such antenna movement may comprise rotating the antenna about its point of attachment to the portable radiotelephone such that the antenna folds along side the radiotelephone when not in use and is rotated away from the radiotelephone when in use. Another such antenna movement may comprise spinning the antenna 213 about its axis when the antenna is either extended or retracted.

A variety of switching mechanisms are also well known to one skilled in the art and should not be limited to the magnet/reed switch combination as described in the preferred embodiments 325–327. Other such switching mechanisms may comprise microswitches and printed circuit board switches. Mechanisms for positively positioning the antenna 213 in at least one of the two positions are well known to one skilled in the art and may be advantageously implemented in conjunction with the present invention. Although the radiotelephones 200 is capable of transmitting and receiving radio frequency signals, the present invention may also be used with wireless communications devices which only transmit or receive radio frequency signals. Such devices which only receive signals may include conventional AM/FM radios or any receiver utilizing an antenna. Devices which only transmit signals may include remote data input devices.

Figure 4:
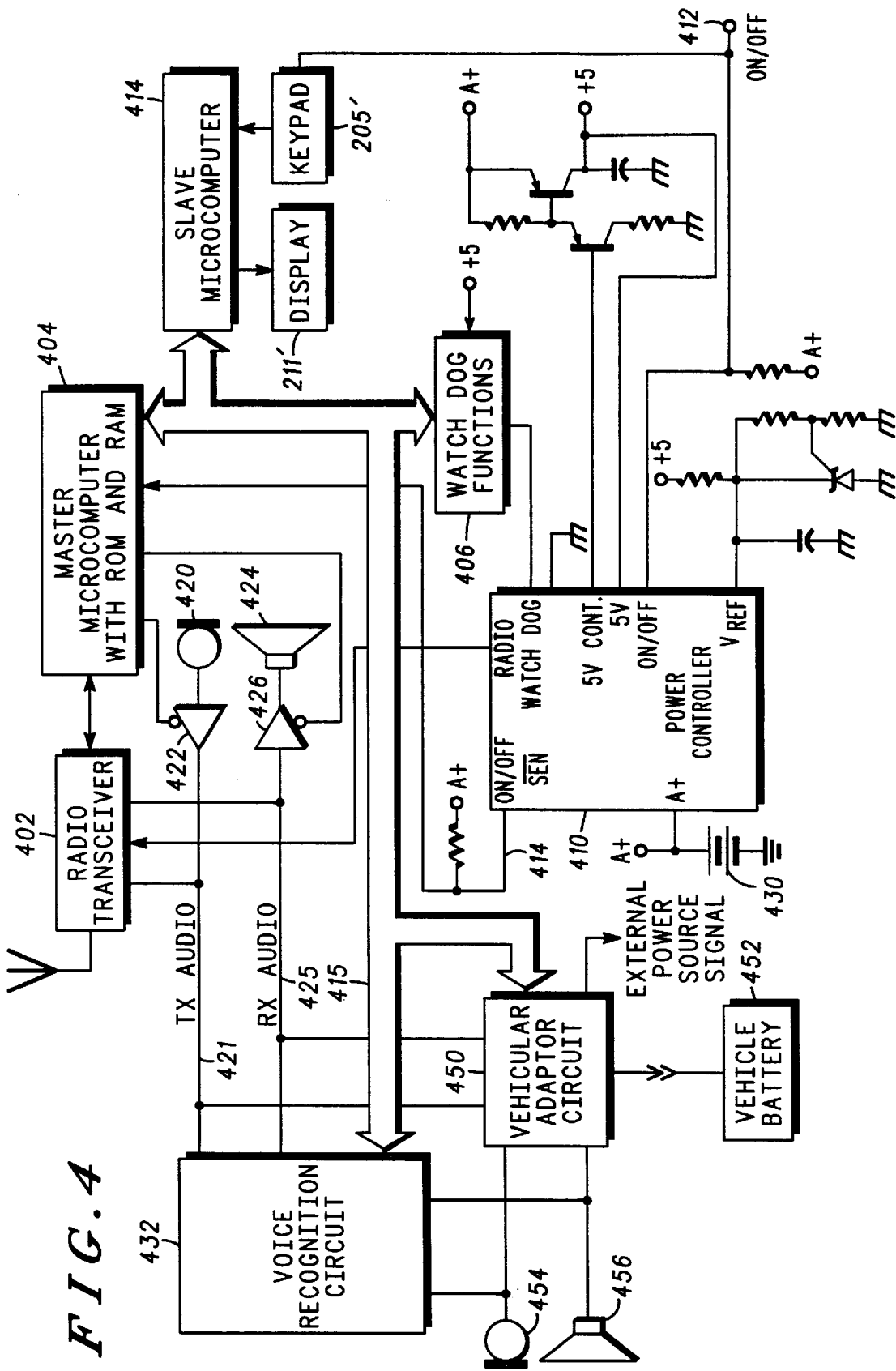
FIG. 4 is a block diagram of the electronic elements of the portable radiotelephone of FIG. 2 embodying the present invention.

Referring to FIG. 4, there is essentially illustrated an electrical block diagram of the cellular portable radiotelephone 200 of FIG. 2 embodying the present invention. Such a portable radiotelephone 200 includes a cellular radiotelephone transceiver 402 operable in cellular radiotelephone systems, internal microphone 420 and switchable amplifier 422, internal speaker 424 and switchable amplifier 426, master microcomputer 404 with conventional RAM (storing pertinent cellular telephone call parameters) and conventional ROM (storing control software), a power controller 410 including regulators coupled to a battery 430 for generating DC (Direct Current) voltages for powering other blocks and coupled to a on/off terminal 412, a slave microcomputer 414 including conventional ROM with controlling software for controlling the display 211' and the keypad 205', a voice recognition circuit 432, a vehicular adapter (hands-free) circuit 450 and watch dog functions 406. External microphone 454, external speaker 456 and a vehicle battery 452 interface with the portable radiotelephone in a vehicular installation.

Master microcomputer 404, slave microcomputer 414, voice recognition circuit 432, vehicular adapter (hands-free) circuit 450 and watch dog functions 406 are coupled to and communicate with one another by way of a three-wire data bus 415, which operates as described in U.S. Pat. Nos. 4,369,516 and 4,616,314 (incorporated herein by reference).

The foregoing transceiver and microcomputer blocks may be conventional blocks of commercially available portable radiotelephones, such as, for example, the "MICROTAC PT" Cellular Telephone available from Motorola, Inc. The "MICROTAC PT" Cellular Telephone is described in further detail in operator's manual no. 68P81150E49, published and available from Motorola C & E Parts, 1313 E. Algonquin Rd., Schaumburg, Ill. 60196.

Audio signals are converted into electrical signals by the internal microphone 420 and are coupled by switchable amplifier 422 to the radio transceiver 402 via conductor at line 421. These signals are then used to modulate the transmitter of the transceiver 402 in conventional fashion. Likewise, signals received by the receiver of transceiver 402 are coupled via conductor at line 425 to switchable amplifier 426 and subsequently to speaker 424 for conversion to acoustic signals.

When the portable radiotelephone is in the voice recognition mode, the signals from the microphone 420 are coupled by switchable amplifier 422 to voice recognition circuit 432 via the conductor at line 421. Audio signals generated by the voice recognition circuit 432 are coupled via conductor at line 425 for connection to the amplifier 426 and subsequently to the speaker 424.

In the preferred embodiment, two interconnected microcomputer systems are utilized to control the basic functions of the portable radiotelephone (the master microcomputer 404) and to control the keypad and display functions (the slave microcomputer). The slave microcomputer is shown in more detail in the schematic of FIG. 5. The slave microcomputer 414 consists of a microcomputer 414 which, in the preferred embodiment is an MC68HC05C4 microcomputer (which also has onboard memory). The basic function of the slave microcomputer is to provide interface to the user of the portable radiotelephone via keypad 205', display 211', and other buttons, indicators and illumination backlighting. The slave microcomputer 414 is coupled to a multi-segment display 211' which, in the preferred embodiment is a conventional LED 8 digit display. The slave microcomputer 414 is also coupled to a keypad matrix of key switches 205' which enables the portable radiotelephone user to input "dial" telephone numbers 517, store and recall telephone number information and perform other radiotelephone functions (such as initiate or terminate a telephone call).

In the preferred embodiments, one of the keys of the matrix 205, 508, is specially dedicated to the function of turning the power "on" and "off". The on/off control is accomplished by a momentary switch closure by key 508 to ground which activates on/off circuitry. Volume increase switch 207' and volume decrease switch 209' are electrically coupled to the slave microcomputer 414 as part of the row/column matrix. Their physical location is away from the keypad 205' on a peripheral surface of the radiotelephone 200 as shown in FIG. 2 to allow for greater user convenience. Additional keys such as the "send" 513, "end" 515, "clear" 521, "function" 523 and memory "store" 525 and "recall" keys an also provided for typical radiotelephone operation.

The on/off function normally performed by the on/off switch 508 on the keypad 205' may also be performed using the switch 307 shown schematically in FIG. 5. A direct current circuit is made or broken by the switch 307 to ground and applied to the on/off line at 412 as an input to the power controller 410.

The function which is normally performed by a hookswitch in a conventional landline telephone is performed in the portable radiotelephone of the present invention as previously described in relation to FIG. 3. The hookswitch is shown schematically as switch 305 in FIG. 5. A DC (Direct Current) circuit is made or broken by the hookswitch 305 to ground and applied to the microcomputer 414 via the hookswitch control signal at line 511. Furthermore, a pulse is generated from any change of state of the hookswitch 305 by a transistor 510, capacitors 512 and 514 and resistors 516, 518, and 519. The output of the transistor 510 is taken from the collector and applied to the interrupt request (IRQ) input and the keypad column inputs of microcomputer 414 having a negative duration of approximately 10 microseconds. Slave microprocessor 414 stores the status of the hookswitch 305 and provides an indication of the change of state of the hookswitch 305 to the master microcomputer 404.

Communication between the slave microcomputer 414 and the master microcomputer 404 is maintained on a data bus 415. This data bus 415 is coupled to the master microcomputer 404 as shown in FIG. 4. Other functions also share the data bus 415 including the voice recognition circuit 432 and the vehicular adapter circuit 415. Assuming that the portable radiotelephone has been turned "on", a keypad 205' depression by the portable radiotelephone user results in a communication between the slave microcomputer 414 and the master microcomputer 404 via the bus 415. The slave microcomputer 414 in the preferred embodiment communicates that a closure has occurred between a particular row and a particular column corresponding to the key pressed by the user. The master microcomputer 404 may then take appropriate action such as returning a digit instruction via the bus 415 for the slave microcomputer 414 to cause the display 211 to illuminate or otherwise display a character. Thus, the slave microcomputer 414 is commanded by the master microcomputer 404 or the user in order to complete an assignment.

Illumination for the keypad 205' is provided, in the preferred embodiments, by a plurality of light emitting diodes (LEDs) indicated by diodes 536 through 541 in FIG. 5. LEDs 536 through 541 are conventionally supplied from a regulated 5 volt voltage source via current limiting resistors and switch transistor 543. Switch transistor 543 is coupled to the TCMP port of the slave microcomputer 414 and is enabled/disabled in accordance with the stored program of the slave processor 414. The LEDs are physically mounted behind the keypad 205 shown in FIG. 2 and provide backlighting to the keys to aid the user in selecting the keys in dim lighting conditions.

Referring now to FIG. 6A, there is illustrated a block diagram of a voice recognition circuit 432 which may be utilized in the present invention. When the voice recognition circuits are activated, microphone audio from an external microphone 454 is coupled to amplifier 610 where the gain is increased to an appropriate input level for the A/D converter 612 and to a transmit (TX) audio path 421. The A/D converter 612 digitizes the amplified analog input signal from the amplifier 610. The digitized signal from the A/D converter 612 is fed into a filter bank 614 comprised of 'n' bandpass filters whose responses overlap at the 3 dB response points. The output from each of the filter bank channels is fed to an 'n' channel energy detector 616 where the amplitude of the signal in each bandpass response is detected. The detected level from each energy detector, at 616, is fed to a conventional microcomputer 618 for comparison with a stored energy template from memory 620. Upon successful correlation of the microphone input with the stored template, microcomputer 618 sends a command on the data bus 415 to the master microcomputer 404. In this manner, a command such as a telephone number to be dialed or a "send" or "end" command may be entered to control radiotelephone operation.

Synthesized voice replies from the voice recognition circuits are initiated by the microcomputer 618 by sending control signals to a random noise generator and pitch generator circuit 622. Signals from these generators are fed to an 'n' channel filter bank 624 which comprises 'n' narrow bandpass filters. The output of these filters are added together in a summer block 626 whose output is fed to a D/A converter 628 where the digital signal is converted to an analog signal. The analog signal is amplified to an appropriate level with amplifier 630 and sent to the receive (RX) audio path 425 which is then sent to the external speaker 456 so that the user will hear the synthesized voice responses. The voice recognition circuits may be activated by the master microcomputer 404 by sending commands to the voice recognition processor 618 over the data bus 415. Similar voice recognition circuits are further disclosed in U.S. Pat. Nos. 4,797,929; 4,817,157; 4,870,686; 4,896,361; 4,945,570; U.S. patent application Ser. No. 07/266,293 ("Word Spotting In a Speech Recognition System Without Predetermined End Point Detection", filed on behalf of Gerson on Oct. 31, 1988) and international publication numbers WO 87/07748 and WO 87/07749 (Dec. 17, 1987).

Referring to 6B there is shown a block diagram of a hands-free vehicular adapter circuit which may be employed in the present invention. The vehicular adapter 450 may be a hands-free adapter with a regulated power supply which couples the portable radiotelephone to a vehicle battery 452. When coupled to duplex hands-free adapter (DHFA) the portable radiotelephone is in the DHFA mode, in which, inter alia, display 211 is disabled when the portable radiotelephone is inactive for a period of time.

Master microcomputer 404 detects the presence of an external power source by monitoring an external power source signal from the vehicular adapter circuit 450. The external power source signal is converted to a binary signal have a binary state indicating whether or not the external power source is present (i.e., binary 0 state equals external power source present).

If the portable telephone is in the DHFA mode, audio amplifiers 422 and 426 are disabled and the TX audio at 421 and RX audio at 425 are routed to the hands-free circuitry of the vehicular adapter circuit 450 for processing and coupling to the hands-free microphone 454 and speaker 456, respectively, as shown in FIG. 6B.

The portable cellular radiotelephone receives its power via the external power source connection which is the output of conventional voltage regulator 642. The voltage supplied by the vehicle battery 452 is voltage regulated and controlled by voltage regulator 642. Control circuitry 644 turns the regulator output on and off in response to signals from the vehicle ignition input at port 646 and data bus 415. Data bus 415 is used by the portable radiotelephone to sense if a hands-free adapter 450 is plugged into the portable radiotelephone. RX audio signal at 425 from the portable radiotelephone is coupled to the amplifier 648 in hands-free adapter 450 to boost the level to drive speaker 456. The output from microphone 454 is connected to the portable radiotelephone via TX audio connection at 421.

Although the preferred embodiments have been implemented employing two microcomputers, this should not be a limitation of the invention for it is possible to implement the present invention in a single microcomputer should the designer so desire. For a single microcomputer or a multiple microcomputer system the microcomputers may be interrupt driven in order to save battery power.

Figure 7:
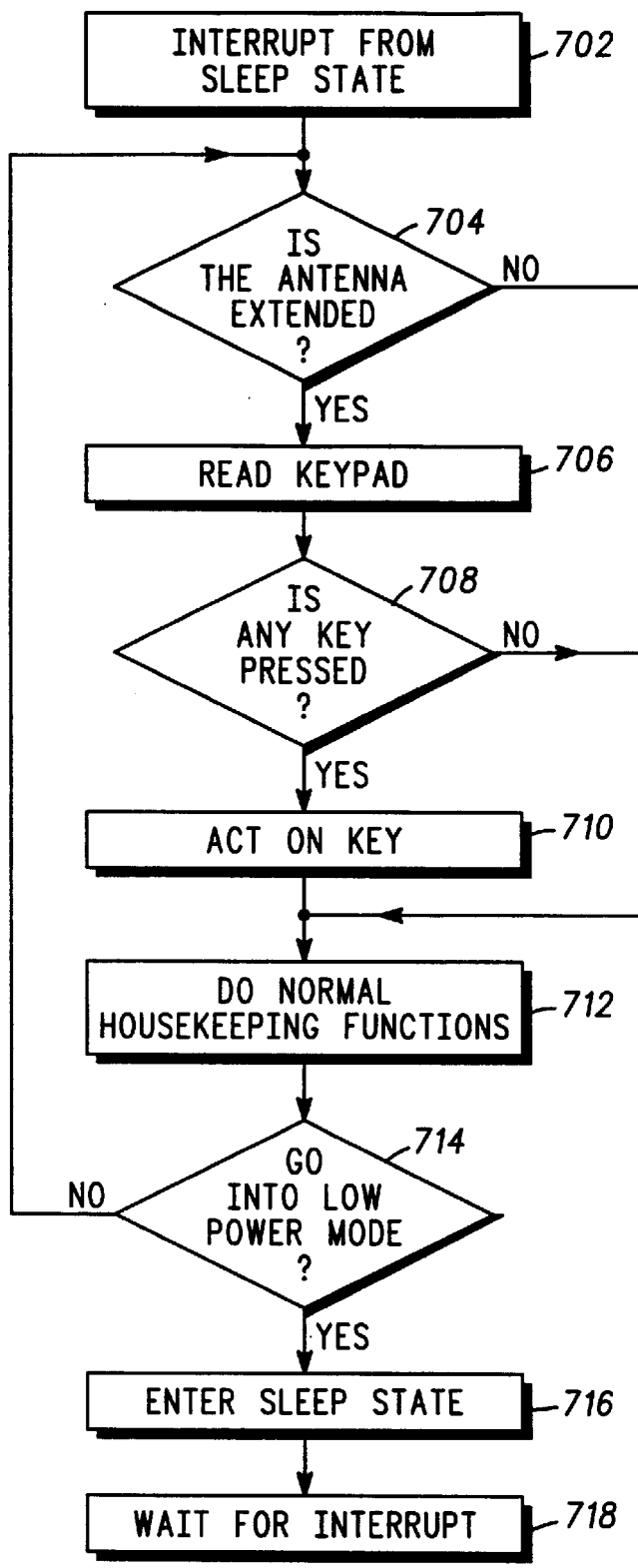
FIG. 7 is a flowchart depicting the deactivation process employed in the slave microcomputer of FIG. 5.

FIGS. 7 through 12B represent the processes followed to realize the preferred embodiments 325 and 327 of the present invention which generate a hookswitch signal responsive to the antenna position. Referring now to FIG. 7, processes followed by the slave microcomputer 414 in realizing the present invention are illustrated in flowchart form. The process of FIG. 7, therefore, commences with an interrupt due to a change of state of the hookswitch 305 to enable the microcomputer system at 702. A determination is made, at 704, whether the antenna is extended or retracted. If the antenna is extended, then the keypad 110 is read to determine which key has been closed at 706. If a key has been depressed, at 708, then the function or character designated by the key is acted upon at 710. If a keypad key has not been depressed, then no action is taken and the microcomputer system resumes its normal functions of controlling the transceiver, the display, and other housekeeping chores as shown at 712. If it is determined that the antenna is retracted at 704, then any keypad key depression is considered to be spurious and is ignored by progressing directly from the determination block at 704 to the normal housekeeping functions block at 712. The entire process is repeated for a predetermined period of time until a determination is made that the microcomputer system should go into a low power consumption mode as determined at 714. The microcomputer system is put into a "sleep" state at 716 and only the low power functions await for an interrupt signal at 718.

Figure 8:
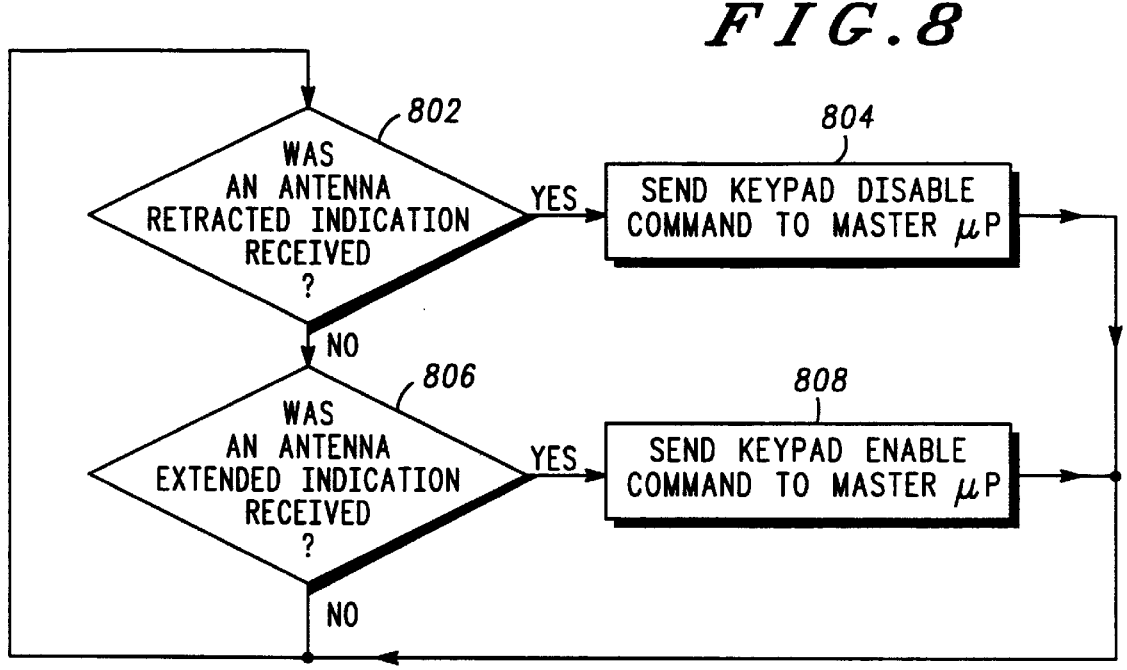
FIG. 8 is a flowchart depicting the process of activation/deactivation employed in the master microcomputer of FIG. 4.

If the microcomputer system is implemented as a master and a slave microcomputer, the master microcomputer utilizes the process shown in FIG. 8 (as part of its standard operating procedure) to prevent spurious key depressions from activating the portable radiotelephone. Since the slave microcomputer 402 can send either an antenna extended indication or an antenna retracted indication, a detection of those indications is necessary by the master microcomputer. A test is made, at 802, of whether the antenna retracted indication has been received from the slave microcomputer 414 on the bus 415. If an antenna retracted indication is received, then the master microcomputer 404 sends a keypad disable command at 804, to the slave microcomputer 414 on the bus 415. The master microcomputer 404 then returns to its programmed routine of chores. If an antenna retracted indication is not received, at 802, then a test is made of whether an antenna extended indication has been received from the slave microcomputer 414, at 806. If such an indication has been received by the master microcomputer 404, then a command is sent to the slave microcomputer 414 on the bus 415 to enable the slave microcomputer 414 to again read any keypad button depressions and to send such information to the master microcomputer 404. Upon completion of the enable command, the master microcomputer 404 returns to its routine chores.

Figure 9A:
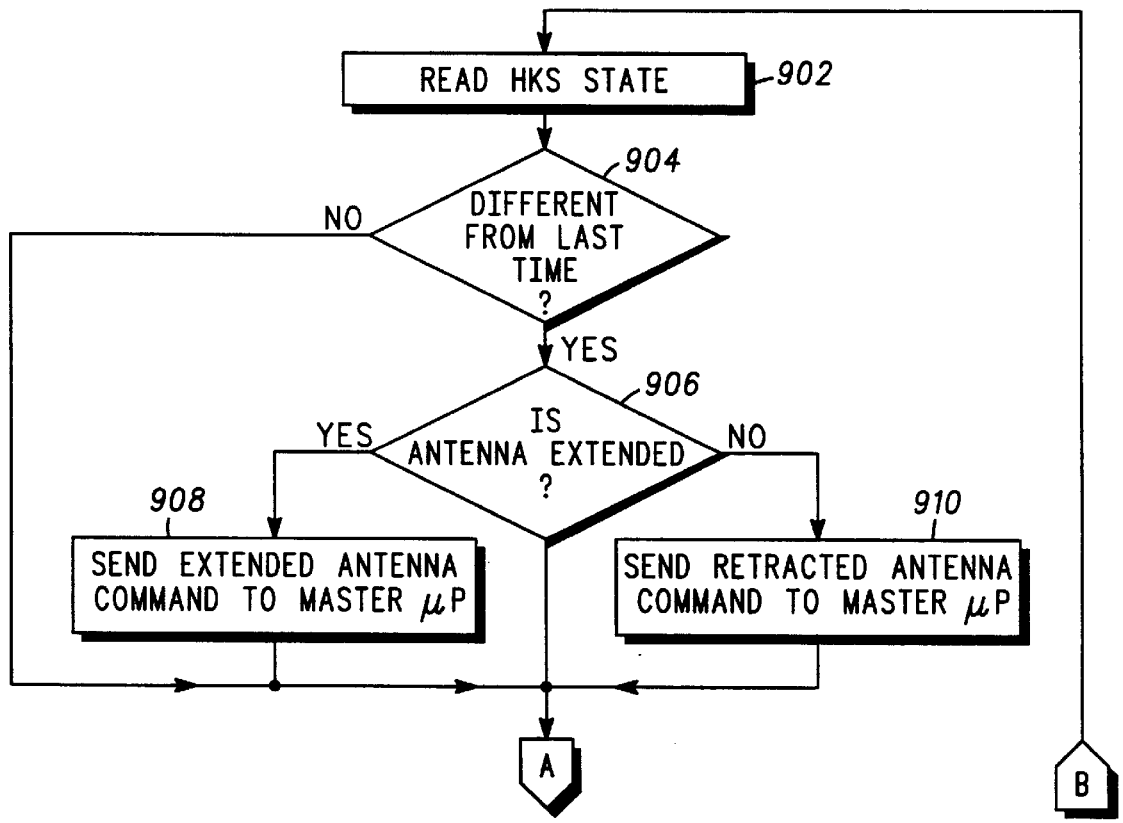
FIGS. 9A and 9B, combined, are flowcharts depicting the process of activation/deactivation employed in the slave microcomputer of FIG. 5.
Figure 9B:
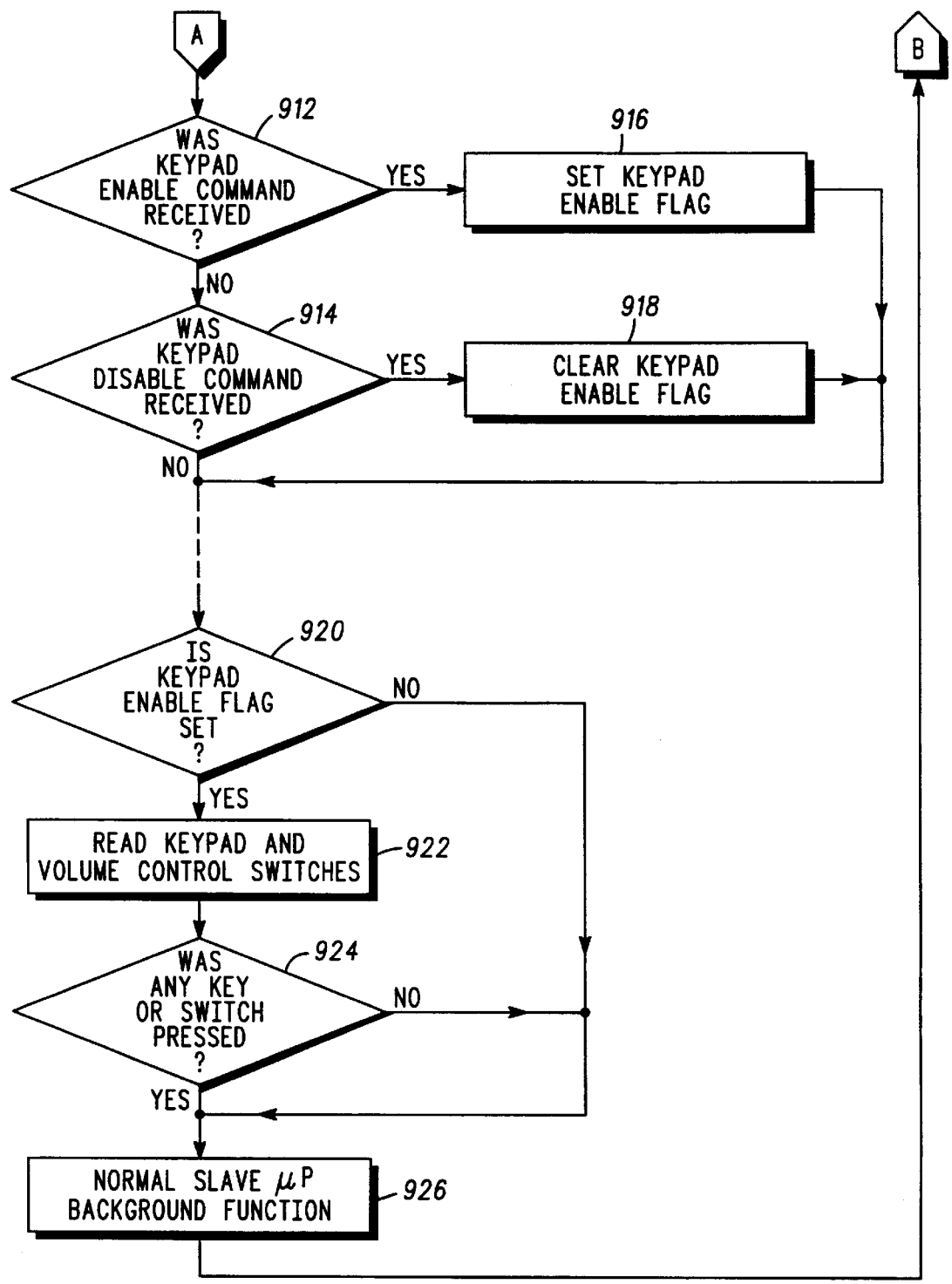

The process followed by the slave microcomputer 414 in realizing the present invention in the preferred embodiment is shown in FIGS. 9A and 9B. The slave microcomputer 414 memorizes the state of the hookswitch 305 corresponding to whether the antenna is extended or retracted. The slave microcomputer 414 determines as part of its routine of chores, whether the hookswitch 305 has changed state by comparing the current state against the stored state at 902 and 904. If the state is different, then a determination is made, at 906 whether the antenna is extended or retracted. If the antenna is determined to be extended, then an extended antenna command (off-hook) is transmitted to the master microcomputer at 908. If the determination is made at 906 yields a retracted antenna, then a retracted antenna command (on-hook) is conveyed to the master microcomputer at 910. In either case the master microcomputer 404 always maintains the antenna state in its associated storage. The slave microcomputer, as part of its routine of chores, checks for a keypad enable or keypad disable command received from the master microcomputer 404. This determination is made at decision blocks 912 and 914. A keypad enable command sets a keypad enable flag in the slave microcomputer 414 memory at 916, while a keypad disable command clears the keypad enable flag at 918 before the process of FIGS. 9A and 9B resumes its normal background flow.

Further along the normal background process the slave microcomputer 414 reads the keypad enable flag, at 920, and reads the row and column lines from the keypads in addition to the volume increase switch 207 and the volume decrease switch 209, at 922, to determine if any key or switch has been depressed, at 924. If a key or switch has been depressed, then an identification of the key or switch depression is sent to the master microcomputer at 926. The process of FIGS. 9A and 9B then returns to the normal slave microcomputer background functions at 926. Thus, if the antenna is determined to be extended, then the keys of the keypad and the volume increase and decrease switches are read in conventional fashion. If the antenna is determined to be retracted then the keys of the keypad and volume increase and decrease switches are ignored.

The "on/off" key 508 is also exposed and prone to accidental actuation. In the preferred embodiment, the on/off key is placed among the matrix of keypad keys for aesthetic reasons. It is a desirable feature that once the power is turned on, the portable transceiver remains in a power-on mode and not be turned off due to a spurious on/off key depression when the antenna is retracted. Likewise, when the portable transceiver is turned off, it is equally desirable that the portable transceiver remain in the powered-off condition even though a spurious on/off key depression may occur when the antenna is retracted. Two processes enable this operation.

Depression of the on/off key is ignored when the antenna is retracted. Referring again to FIG. 4, when a momentary depression of the on/off switch 508 occurs, a ground signal is applied to the on/off line at 412 into the power controller 410 of FIG. 4. The ground signal is buffered by power controller 410 and applied to the master microcomputer 404 via line 414. Upon receipt of this buffered on/off signal on line 414, the master microcomputer 404 follows the process flow charted in FIG. 10.

Figure 10:
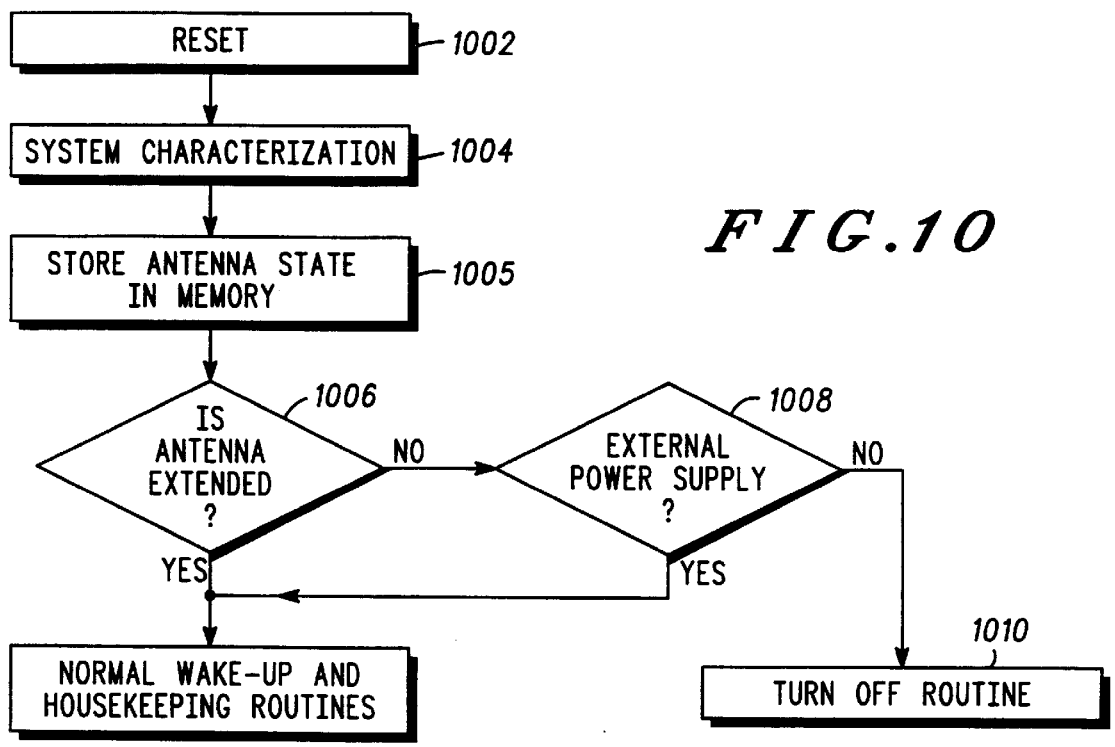
FIG. 10 is a flowchart depicting the process of activation/deactivation of the power on/off switch upon initial power-up of the master microcomputer of FIG. 4.
Figure 11:
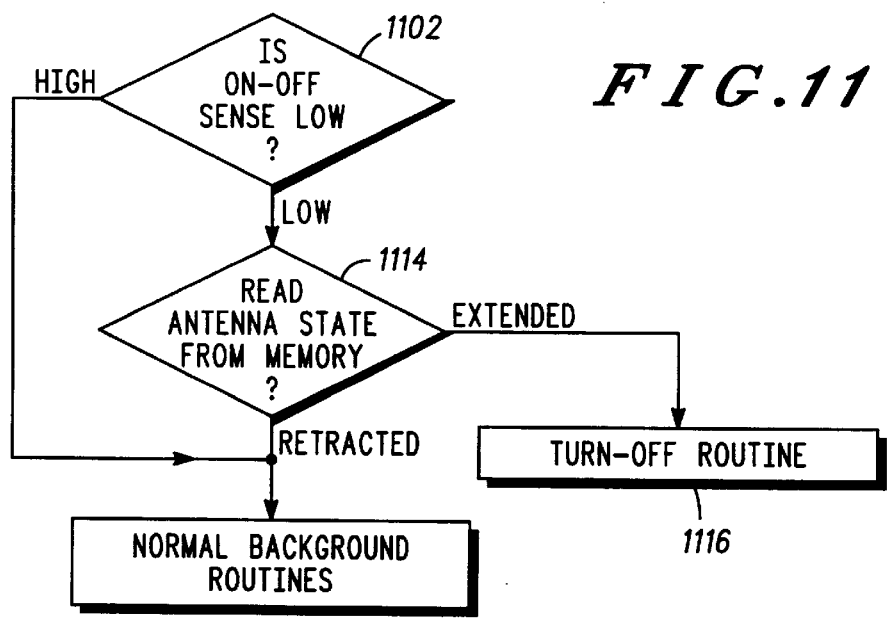
FIG. 11 is a flowchart depicting the process of activation/deactivation of the power on/off switch after initial power-up of the master microcomputer of FIG. 4.

In FIG. 10, the master microcomputer 404 and the rest of the associated microcomputer system undergoes a reset operation at 1002 and requests a system characterization (a definition of what peripherals exist on the bus) at 1004. As part of the characterization process, the slave microcomputer 414 reports the state of the antenna. The current antenna state is then stored, at 1005. The master microcomputer then determines if the antenna is extended, at 1006. If this determination is positive, then the master microcomputer proceeds with its normal wake-up and house keeping routines. If the antenna is determined to be retracted at 1006, then a check is made to determine if an external supply has been connected to the portable radiotelephone at 1008. A similar circuitry sharing arrangement is further described in U.S. Pat. No. 5,029,233.

If an external supply is determined to exist at 1008, then the master microcomputer 404 returns to its normal housekeeping routines. If the external supply is not connected, then a power turn-off routine is followed at 1010. Power turn-off is accomplished by the master microcomputer 404 by storing its status and other essential parameters in memory before allowing the watchdog functions 406 of FIG. 4 to run out. A watch dog power function run out is communicated to the power controller 410 which subsequently turns off the portable radiotelephone.

Once the master microcomputer 404 has successfully powered up any on/off switch depressions are ignored so as long as the antenna is retracted. A determination of the signal sense on line 414 of FIG. 4 is made by the master microcomputer 404 at 1102 of FIG. 11. If the sense is signal high, then the master microcomputer continues with its background routines. If the sense is low, then the master microcomputer reads the status of the antenna state in storage at 1114 and either proceeds with a turn off routine at 1116 if the antenna is extended or ignores a depression of the on/off switch as a spurious depression if the antenna is retracted. Thus, a valid on/off command may be processed only if the antenna is extended.

Figure 12A:
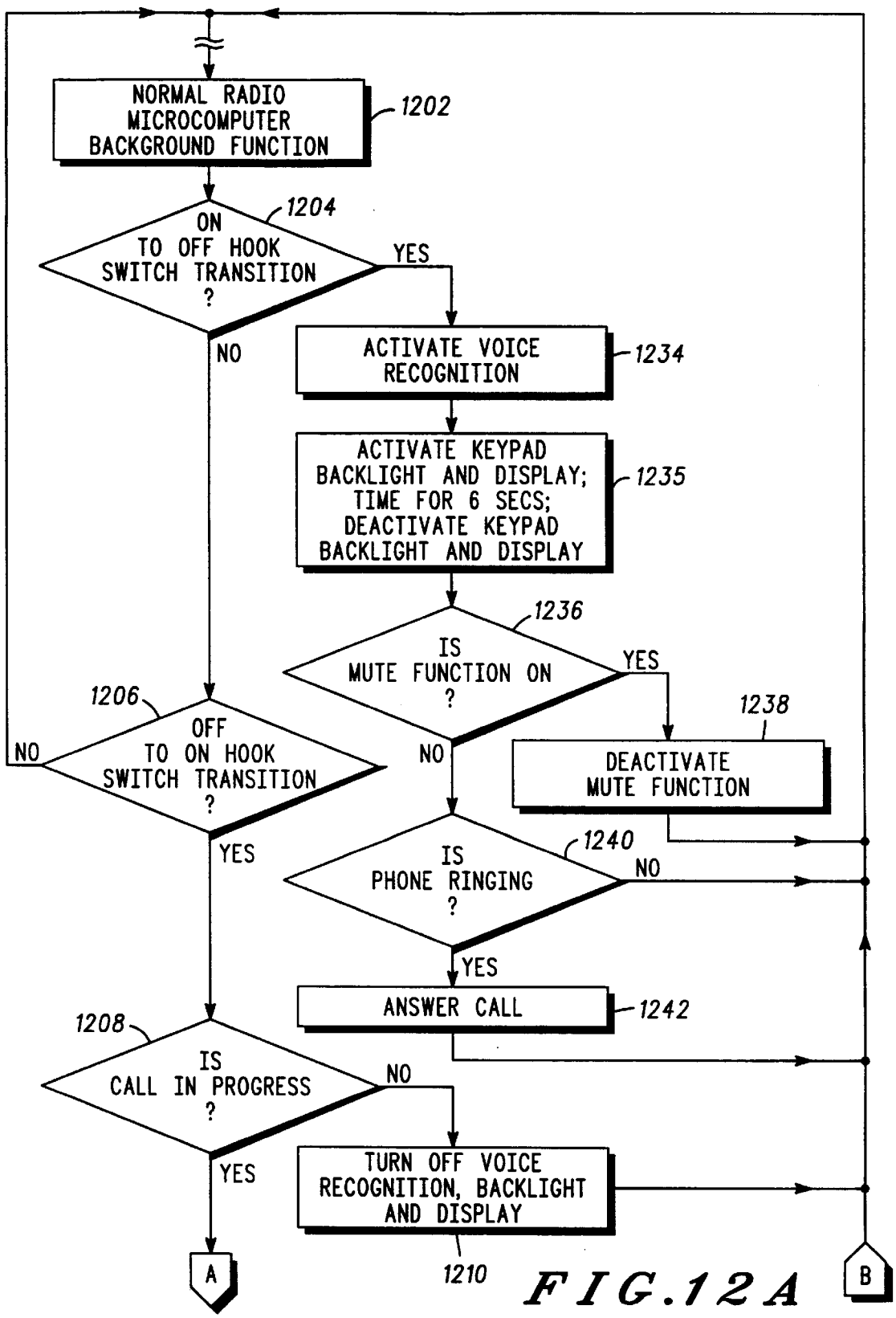
FIGS. 12A and 12B are a flowchart depicting the process of interpreting hookswitch operation of the master microcomputer of FIG. 4.
Figure 12B:
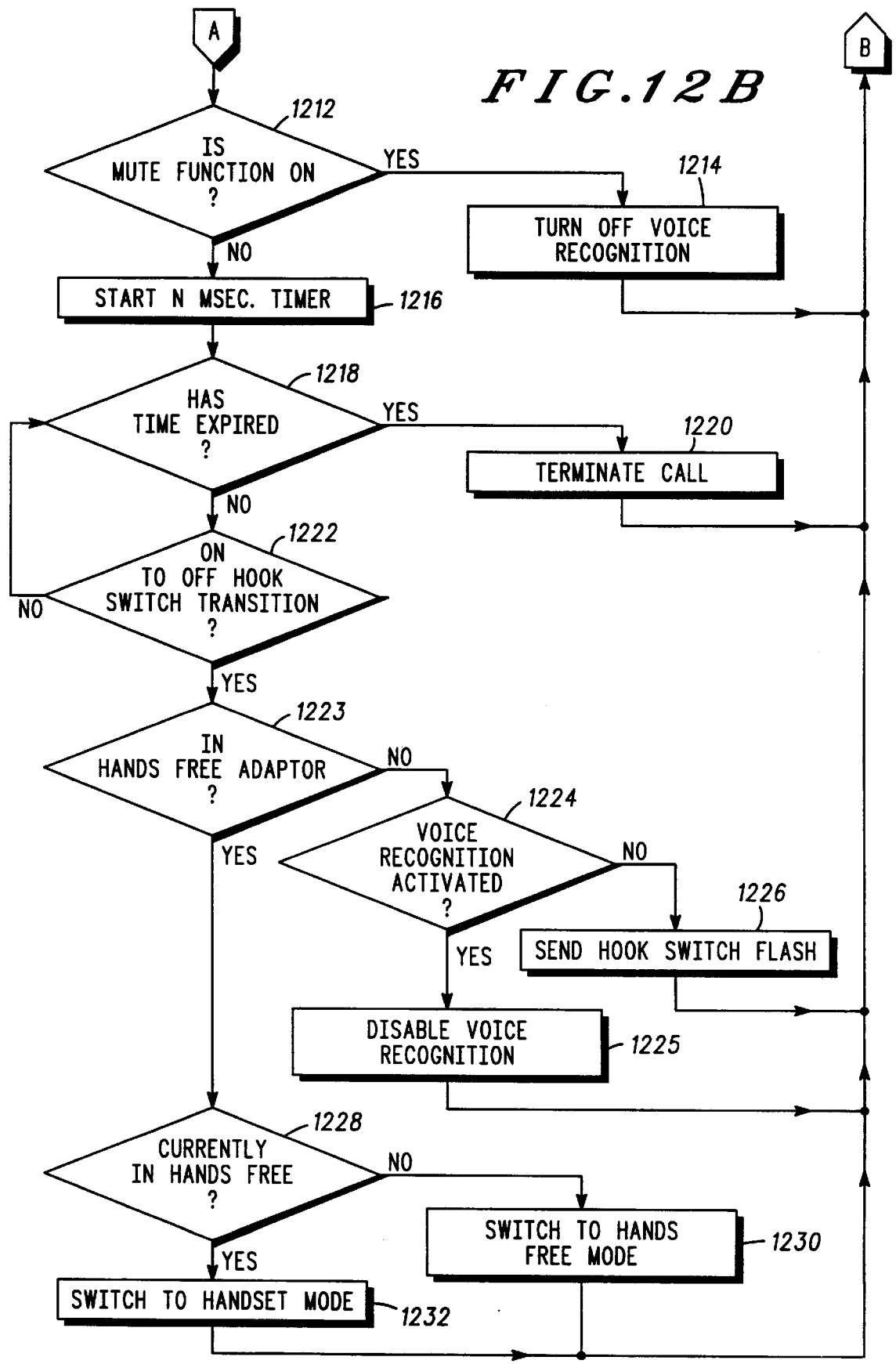

The process followed by the master microcomputer 404 in realizing the present invention in the preferred embodiment 325 and 327 is shown in FIGS. 12A and 12B. The master microcomputer 404, as part of its routine of chores, at 1202, checks for an on-hook to off-hook transition at 1204. If an on-hook to off-hook transition has not occurred then flow proceeds to determination block 1206 where a test is made to determine if an off-hook to on-hook transition has occurred. If none has occurred, then flow returns to the normal background functions at 1202. If it is determined that an off-hook to on-hook transition has occurred at 1206 indicating that the antenna 213 is in the retracted position, then flow proceeds to determination block 1208 where a test is made to determine if a telephone call is presently in progress. If it is determined that a call is not presently in progress, then flow proceeds to 1210 where the voice recognition circuitry is disabled, the backlighting is inactivated, and the display is inactivated. Thus, if the antenna 213 is retracted while a call is not in progress, then the voice recognition circuitry, the backlighting, and the display are inactivated.

Optionally, the display may remain actuated for a period of six seconds before being deactivated by such an off-hook to on-hook transition. From 1210, flow returns to the normal background functions at 1202. If a determination is made that a call was in process, at 1208, then flow proceeds to determination block 1212. A test is made at 1212, of whether the microphone mute function is on. If the microphone is muted, then flow proceeds to 1214 where the voice recognition circuitry is disabled. Thus, when the antenna 213 is retracted while a call is in progress and the microphone is muted, the voice recognition circuitry is disabled. Flow proceeds from block 1214 to 1202 where flow returns to normal background functions. If it is determined, at 1212, that the microphone is not muted, then flow proceeds to block 1216 where a timer of 'n' milliseconds is started. This timer runs until it has either expired or the antenna is extended. After the counter is started, flow proceeds to determination block 1218 where a test is made to determine whether the timer has expired. If the timer has expired then the flow proceeds to block 1220 where the telephone call is terminated. Thus, if the antenna is retracted for longer than 'n' milliseconds while a call is in progress and the microphone is not muted, then the call is terminated. In the preferred embodiments, the timer duration 'n' is 1000 milliseconds.

The flow proceeds to determination block 1222 where a test is made of whether an on-hook to off-hook transition has occurred. If no on-hook to off-hook transition has occurred, then flow returns to determination block 1218. Flow continues in the 1218–1222 loop until either the timer expires or an on-hook to off-hook transition occurs. If a determination is made, at 1222, that an on-hook to off-hook transition has occurred prior to the timer expiring, then flow proceeds to determination block 1223. A test is made, at 1223, of whether the telephone is coupled to the hands-free vehicular adaptor circuit 450. One such vehicular adaptor circuit which may be employed by the present invention is a S1747A available from Motorola, Inc. If the telephone is not coupled to the vehicular adaptor 450 then flow proceeds to a decision block 1224, where a determination of whether the voice recognition circuit has been enabled. If the voice recognition circuit has been enabled, it is then disabled, at block 1225, before the process returns to the normal background functions at 1202. If the voice recognition circuit is not enabled at this time, then the process proceeds to block 1226 where a hookswitch flash signal is sent.

Optionally, a hookswitch flash signal may be sent if the "send" key on the keypad is depressed. Thus, if the portable radiotelephone is coupled to the hands free vehicular adaptor 450 and is engaged in a telephone call when the hands-free circuit of the vehicular adaptor is enabled, the momentary retraction and extension of the antenna (in less than 'n' msec.) deactivates the hands-free function and the portable radiotelephone reverts to the use of the internal microphone and speaker. Likewise, if the portable radiotelephone is coupled to the hands-free adaptor 450 and engaged in a telephone call with the hands-free circuit disabled, the momentary retraction and extension of the antenna results in the activation of the hands-free circuit. If the portable radiotelephone is not coupled to the hands-free vehicular adaptor 450 and is presently in a call with the microphone not muted where the antenna is momentarily retracted and then extended prior to the timer expiring, then either the voice recognition circuit is disabled or a hookswitch flash signal is sent. From 1226, flow returns to the normal background functions at 1202.

If a determination is made, at 1223, that the telephone was in the hands-free vehicular adaptor, then the process flow continues to determination block 1228. A test is made at 1228, to determine whether the telephone is currently in the hands-free mode. If it is determined, at 1228, that the telephone is not in the hands-free mode, then the process flow proceeds to block 1230 where the mode is set to the hands-free mode. In the hands-free mode, the internal microphone 420 and speaker 424 are inactivated and the external microphone 454 and external speaker 456 are active. Thus if the portable radiotelephone is in the hands-free vehicle adaptor 450 and is presently in a call with the microphone not muted while the antenna is momentarily retracted and then extended prior to the timer expiring but is not in the hands-free mode at the time, then the mode is changed from a private call with the radiotelephone's internal microphone and speaker to the hands-free mode using the external microphone and speaker.

From 1230, flow returns to the normal background functions at 1202. If it is determined, at 1228, that the portable radiotelephone was in the hands-free mode then the flow proceeds to block 1232 where the mode is changed from the hands-free mode to a private call using the radiotelephone's internal microphone and speaker. Thus if the portable radiotelephone is in the hands-free vehicular adaptor 450 and is presently in a call with either microphone not muted while the antenna 213 is momentarily retracted and then extended prior to the timer expiring and the radiotelephone is in the hands-free mode at the time, then the mode is changed from the hands-free mode to that of a private call using the radiotelephone's internal microphone 420 and speaker 424. From 1232, flow returns to the normal background functions at 1202.

If it is determined, at 1204, that an on-hook to off-hook transition occurred then the flow proceeds to block 1234 where the voice recognition circuitry 432 is activated. The process then, at 1235, activates the keypad backlighting illumination and the display 211 for a conventionally timed period of six seconds. Thus, if the master microcomputer 404 is performing normal background functions and an on-hook to off-hook transition occurs, then the voice recognition circuitry is activated, the keypad backlighting is activated, the display is activated. The flow continues to determination block 1236. A test is made, at 1236, to determine whether the microphone mute function is on. If it is determined, at 1236, that the microphone is muted, then flow proceeds to block 1238, where the microphone is unmuted. Thus, if the microphone is in the muted state with the antenna 213 retracted, extending the antenna will unmute the microphone, from 1238 flow returns to the normal background functions 1202.

If it is determined, at 1236, that the microphone was not muted, then flow proceeds to determination block 1240. A test is made, at 1240, to determine whether the portable radiotelephone is currently ringing. If it is determined, at 1240, that the portable radiotelephone is not ringing, indicating that there is no incoming call, then the process flow returns to the normal background functions at 1202. If it is determined, at 1240, that the radiotelephone is ringing, then the process flow proceeds to block 1242 where the incoming call is answered. Thus, if the portable radiotelephone is ringing while the antenna 213 is retracted an the antenna 213 is extended, the incoming call is answered. From 1242, flow returns to the normal background functions at 1202.

According to the present invention, the radiotelephone's transmit power is yet another predetermined operating mode that can be controlled responsive to the position of the antenna. The transmitter's power is adjusted responsive to the position of the antenna so that the radio can transmit RF signals at a higher power level while limiting the exposure of humans to energy radiated by the transmitter's antenna. Radiotelephones having adjustable transmit power responsive to the position of the antenna may or may not include the prior art flip element 101. If the flip element 101 is not included as shown in FIG. 2, the movable antenna may combine the adjustable transmit power control with other appropriate control functions described hereinabove.

Figure 13:
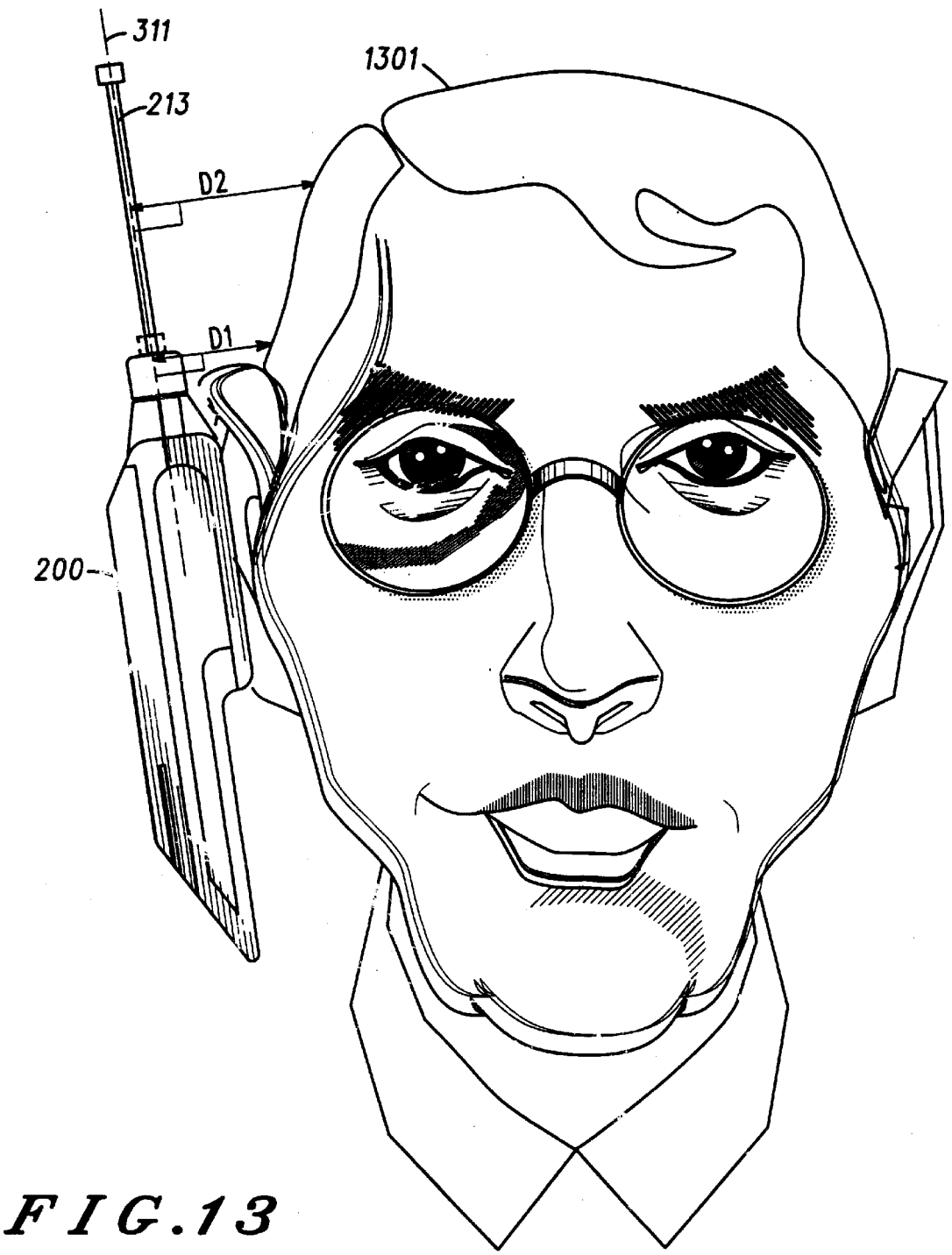
FIG. 13 is a drawing showing the change in distance between an antenna of a portable radiotelephone and a user's head when the antenna is retracted and extended.

FIG. 13 is a drawing showing the change in distance between the antenna 213 of the portable radiotelephone 200 and a user's head 1301 when the antenna is retracted and extended. The antenna 213 is located at a first predetermined distance D1 and a second predetermined distance D2 away from a portion of the body, particularly the head 1301, of the user operating the radiotelephone 200 when the antenna is moved to the retracted position and extended position, respectively. The present invention may be used with any type of movable antenna and not the particular axial antenna shown and described herein.

For a given transmit power, the exposure of the user's head 1301 to the antenna's radiated energy decreases when the antenna 213 is extended and increases when the antenna is retracted primarily because of the change in distance between the antenna 213 and the user's head 1301 when the antenna 213 is moved. Since the exposure of the head to the antenna's radiated energy decreases when the antenna 213 is extended, the radio's transmit power is increased when the antenna 213 is extended. Conversely, since the exposure of the head 1301 to the antenna's radiated energy increases when the antenna is retracted, the radio's transmit power is reduced when the antenna is retracted. Thus, the transmitter's power is adjusted so that the radio can transmit RF signals at a high power level when the antenna is extended and at a low power level when the antenna is retracted to limit the exposure of humans to energy radiated by the transmitter's antenna in both the extended and retracted positions.

The high and low power levels at which the portable radiotelephone 200 transmits RF signals are defined as Classes in EIA INTERIM STANDARD, Cellular System Mobile Station—Land Station Compatibility Specification, IS-3-D, Mar. 1987. The EIA STANDARD defines Class 1 to be a high power radio (3 W), Class 2 to be a mid-range power radio (1.2 W) and Class 3 to be a low power radio (0.6 W). The Classes are primarily distinguished by the maximum power level at which the portable radiotelephone 200 can transmit RF signals. The present portable radiotelephone 200 is a Class 3, low power, radiotelephone when the antenna is retracted and a Class 2, mid-range power, radiotelephone when the antenna is extended.

The transmit power of the portable radiotelephone 200 may be adjustable or fixed in at least one of the retracted and extended positions. Table 2.1.2-1 of the EIA STANDARD defines seven power levels below the maximum power level at which the transmit power may be adjusted for each Class while the portable radiotelephone is transmitting. Thus, the transmit power of the portable radiotelephone 200 is adjustable within the Class 3 and Class 2 when the antenna is moved to the retracted and extended position, respectively. Other portable radiotelephones may operate as a portable cordless radiotelephone having a fixed transmit power when the antenna is retracted and as a portable cellular radiotelephone having an adjustable transmit power when the antenna is extended.

Returning now to FIG. 3A, the antenna 213 of the radiotelephone 325 is shown to be movable between a first position 313 axially retracted substantially inside the radiotelephone 325 and a second position 314 axially extended substantially outside the radiotelephone 325. The reed switch 305 and the magnet 301 provides means for detecting movement of the antenna between the retracted and extended positions.

Referring now to FIG. 4 and 5, the transceiver 420 comprises means for transmitting an output signal from the antenna 213 and means for receiving an input signal from the antenna 213. Means for transmitting includes conventional power amplifying means having gain. The slave microcomputer 414 in combination with the master microcomputer 404 (per FIG. 4) provide controlling means for adjusting the gain of the power amplifier responsive to the detected movement of the antenna to adjust the radiotelephone's transmit power.

Thus, the radiotelephone advantageously provides means for transmitting from the antenna 213 an output signal having a first and a second output power level when the antenna is moved to the first and the second position, respectively. Stated from another perspective, the radio produces a first and a second transmit power responsive to the antenna being moved between the first and the second position, respectively.

The portable radiotelephone conventionally notifies a remote base station (not shown) of its Class at the beginning of transmission. The EIA STANDARD, per section 2.3.3, defines a digital representation of the Classes as a Station Class Mark. The Station Class Mark is sent to the base station from the portable unit as a four bit digital code via a control channel per section 2.7.1.1, Word A of the EIA STANDARD.

A complementary feature of the present invention enables the radiotelephone to also notify the base station of its Class not only at the beginning of transmission but also at any other time during transmission via a blank and burst control message on the voice channel. The movable antenna provides means for selecting to transmit the output signal at least one of a first and a second power level. The means for selecting comprises any user interface and need not be limited to the movable antenna as shown and described herein. The base station is notified of the selected power level during the transmission of the output signal.

Means for notifying the base station of the change in Class during radiotelephone transmission is accomplished by sending the updated four bit Station Class Mark via the Order Confirmation Message as described in the EIA STANDARD section 2.7.2.1. Presently, nineteen bits are not used of which four are assigned to the updated Station Class Mark. Thus, while the radiotelephone is in a call, the base station is notified of the change in power level of the radiotelephone. This up to date power information allows the base station to control the adjustment of the transmit power within the new Class, as required, to improve the radiotelephone's transmit performance.

Figure 14:
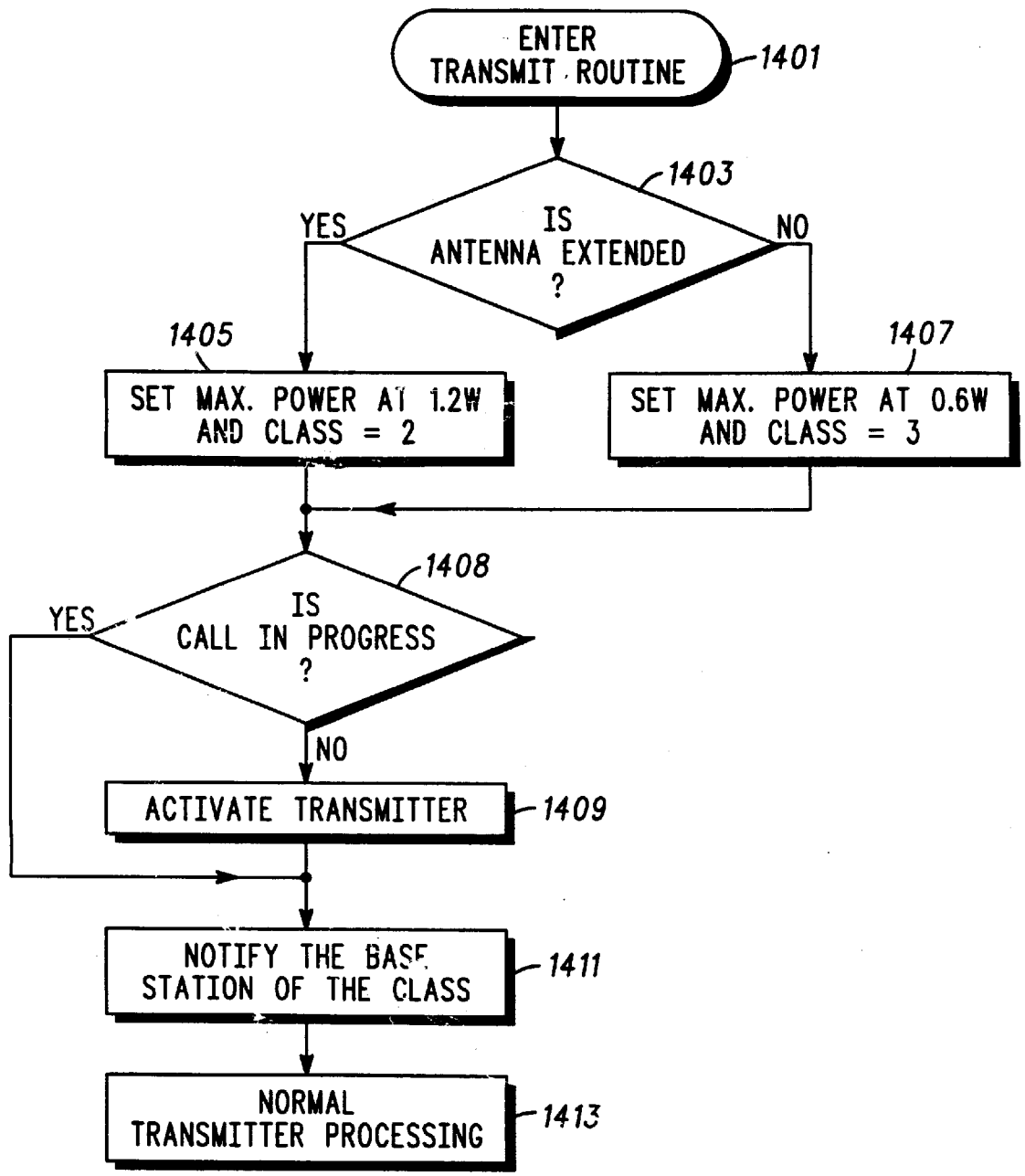
FIG. 14 is a flowchart depicting a change the transmit power of a portable radiotelephone responsive to the radiotelephone's antenna position.

FIG. 14 is a flowchart depicting a change in the radiotelephone's transmit power responsive to the radiotelephone's antenna position. FIG. 14 accounts for the antenna being moved before a call is initiated and while a call is in process. The transmit routine at block 1401 is entered either when the user initiates a call (i.e. begins transmission) or when the user moves the antenna while in a call (i.e. during transmission). The radiotelephone determines whether the antenna is extended or retracted at block 1403. The radiotelephone sets the maximum transmit power at 0.6 W corresponding to Class 3 at block 1407 when the antenna is retracted and at 1.2 W corresponding to Class 2 at block 1405 when the antenna is extended. If a call is determined to be in process at block 1408 (i.e. the transmitter already active), the radiotelephone bypasses block 1409 to notify the base station of the Class at block 1411. Otherwise, if a call is determined not to be in process at block 1408 (i.e. the transmitter is inactive), the radiotelephone activates the transmitter at block 1409 and notifies the base station of the Class at block 1411. After the base station is notified of the radiotelephone's Class at block 1411, normal transmitter processing resumes at block 1413.

What is claimed is:

1. A portable radiotelephone comprising:

an antenna element moveable between a stowed position and an unstowed position;

a detector for detecting the movement of the antenna element between the stowed and the unstowed position, wherein the movement of the antenna causes the detector to be in a first state when the antenna element is moved to the stowed position and causes the detector to be in a second state when the antenna element is moved to the unstowed position;

a transmitter for transmitting a signal at a first power level or a second power level, wherein the second power level is greater than the first power level; and a controller, coupled to the detector and the transmitter, wherein the controller controls the transmitter to transmit the signal at the first power level when the detector is in the first state and controls the transmitter to transmit the signal at the second power level when the detector is in the second state.

2. A portable radiotelephone in accordance with claim 1 wherein:

the transmitter is operative to transmit the signal at a first power level within a first range of power levels and at a second power level within a second range of power levels, wherein a second maximum power level of the signal within the second range of power levels is greater than a first maximum power level of the signal within the first range of power levels; and the controller controls the transmitter to transmit the signal at the first power level within the first range of power levels when the detector is in the first state and controls the transmitter to transmit the signal at the second power level within the second range of power levels when the detector is in the second state.

3. A portable radiotelephone in accordance with claim 2 wherein the power level of the signal is adjustable within at least one of the first and the second range of power levels.

4. A portable radiotelephone in accordance with claim 2 wherein the power level of the signal is fixed within at least one of the first and the second range of power levels.

5. A portable radiotelephone in accordance with claim 2 wherein the power level of the signal is fixed within the first range of power levels when the detector is in the first state and adjustable within the second range of power levels when the detector is in the second state.

6. A portable radiotelephone in accordance with claim 2 wherein the first and the second range of power levels of the transmitter further comprise Class 3, low power levels, and Class 2, mid-range power levels, respectively.

7. A portable radiotelephone in accordance with claim 2 wherein the controller notifies a base station via the transmitter that the transmitter is operable to transmit the signal at a power level within the first range of power levels and at a power level within the second range of power levels when the detector is in the first state and the second state, respectively.

8. A portable radiotelephone in accordance with claim 7 wherein the notification occurs during a telephone call.

9. A portable radiotelephone in accordance with claim 1 further comprising:

a housing including the detector, the transmitter and the controller;

wherein the antenna element is axially retracted substantially inside the housing when the antenna element is moved to the stowed position and axially extended substantially outside the housing when the antenna element is moved to the unstowed position.

10. A portable radiotelephone comprising:

a transmitter for transmitting a signal at a power level within one of a plurality of predetermined ranges of power levels, wherein each of the plurality of predetermined ranges of power levels is indicative of a maximum power level of the signal therein;

means for selecting one of the plurality of predetermined ranges of power levels for transmitting the signal; and means for notifying a base station during a telephone call that the transmitter is operable to transmit the signal at the selected one of the plurality of predetermined ranges of power levels.

11. A portable radiotelephone in accordance with claim 10 wherein the means for selecting further comprises antenna means including an antenna element moveable between a stowed and an unstowed position, wherein a first and a second range of power levels of the plurality of predetermined ranges of power levels are selected when the antenna element is moved to the stowed and the unstowed position, respectively.

12. A method of operating a portable radiotelephone, the portable radiotelephone including an antenna element moveable between a stowed position and an unstowed position and including a transmitter for transmitting a signal at a first power level or a second power level, wherein the second power level is greater than the first power level, the method comprising the steps of:

detecting the movement of the antenna element between the stowed and the unstowed position, wherein the movement of the antenna causes the detector to be in a first state when the antenna element is moved to the stowed position and causes the detector to be in a second state when the antenna element is moved to the unstowed position; and controlling the transmitter to transmit the signal at the first power level when the detector is in the first state and controls the transmitter to transmit the signal at the second power level when the detector is in the second state.

13. A method in accordance with claim 12 wherein the step of transmitting further comprises the step of adjusting the power level of the signal within at least one of the first and the second range of power levels.

14. A method in accordance with claim 12 wherein the step of transmitting further comprises the step of fixing the power level of the signal within at least one of the first and the second range of power levels.

15. A method in accordance with claim 12 further comprising the step of notifying a base station that the transmitter is operable to transmit the signal at the power level within the first and the second range of power levels when the antenna element is moved to the stowed and the unstowed position, respectively.

16. A method in accordance with claim 12 wherein the step of notifying occurs during a telephone call.

17. A method of operating a portable radiotelephone comprising the steps of:

transmitting a signal at a power level within one of a plurality of predetermined ranges of power levels, wherein each of the plurality of predetermined ranges of power levels is indicative of a maximum power level of the signal therein;

selecting one of the plurality of predetermined ranges of power levels for transmitting the signal; and notifying a base station during a telephone call that the signal is operable to be transmitted at the selected one of the plurality of predetermined ranges of power levels.

18. A method in accordance with claim 17 wherein the step of selecting further comprises the step of detecting movement of an antenna element of antenna means between a stowed and an unstowed position, wherein a first and a second range of power levels of the plurality of predetermined ranges of power levels are selected when the antenna element is moved to the stowed and the unstowed position, respectively.

19. A portable communication device comprising:

an antenna moveable between a stowed position and an unstowed position;

a detector for detecting the movement of the antenna between the stowed and the unstowed position;

a transmitter for transmitting a signal at one of a first power level and a second power level within at least one predetermined range of power levels, wherein the second power level is greater than the first power level within the at least one predetermined range of power levels; and a controller, coupled to the detector and the transmitter, for controlling the transmitter to transmit the signal at the first power level when the detector detects the antenna to be moved to the stowed position and for controlling the transmitter to transmit the signal at the second power level when the detector detects the antenna to be moved to the unstowed position.

20. A portable radiotelephone comprising:

an antenna moveable between a stowed position and an unstowed position;

a detector for detecting when the antenna is in the stowed position and the unstowed position;

a transmitter for transmitting a signal at one of a plurality of predetermined power steps up to a maximum power step, wherein the maximum power step is a first maximum power step when the detector detects that the antenna is in the stowed position, and wherein the maximum power step is a second maximum power step, higher than the first maximum power step, when the detector detects that the antenna is in the unstowed position; and a controller for controlling the transmitter to transmit the signal at one of the plurality of predetermined power steps up to the maximum power step.

21. A method of operating a portable radiotelephone comprising the steps of:

detecting movement of an antenna between a stowed position and an unstowed position; and transmitting a signal at one of a plurality of predetermined power steps up to a maximum power step, wherein the maximum power step is a first maximum power step when the detector detects that the antenna is in the stowed position, and wherein the maximum power step is a second maximum power step, higher than the first maximum power step, when the detector detects that the antenna is in the unstowed position.

22. A portable radiotelephone comprising:

a housing having a microphone and a speaker and adapted to be positioned against a user's head to permit a user to speak into the microphone and listen from the earpiece speaker;

an antenna moveable between a stowed position and an unstowed position relative to the housing, wherein the antenna is positioned closer to the user's head when the antenna is in the stowed position than when the antenna is in the unstowed position;

a transmitter for transmitting a signal at one of a plurality of predetermined power levels up to a maximum power level, wherein the maximum power level is lower when the antenna is in the stowed position than when the antenna is in the unstowed position; and a controller for controlling the transmitter to transmit the signal at one of the plurality of predetermined power levels up to the maximum power level.

* * * * *

UNITED STATES PATENT AND TRADEMARK OFFICE
CERTIFICATE OF CORRECTION

PATENT NO. : 5,815,820
DATED : October 15, 1998
INVENTOR(S) : Kiem

It is certified that error appears in the above-indentified patent and that said Letters Patent is hereby corrected as shown below:

In column 2 between lines 29 and 30,
add the section title -- SUMMARY OF THE INVENTION --

Claim 13
In column 21, on line 12 please change "of" to -- of: --

Claim 14
In column 21, on line 16 please change "of" to -- of: --

Claim 15
In column 21, on line 20 please change "of" to -- of: --

Claim 16
In column 21, on line 26 please change "claim 12" to -- claim 15 --

Signed and Sealed this

Twenty-fifth Day of April, 2000

Attest:

Q. TODD DICKINSON

*Attesting Officer*  *Director of Patents and Trademarks*